US012428241B1

(12) United States Patent
Iannetti et al.

(10) Patent No.: US 12,428,241 B1
(45) Date of Patent: Sep. 30, 2025

(54) BYPASS OF ITEMS IN A SECURITY LANE OF A SECURITY CHECKPOINT

(71) Applicant: Analogic Corporation, Peabody, MA (US)

(72) Inventors: Andrew Iannetti, Danvers, MA (US); Sevag Minas Zoboyan, Wakefield, MA (US); Steven Urchuk, Melrose, MA (US); Tom Ripp, Amherst, NH (US)

(73) Assignee: Analogic Corporation, Peabody, MA (US)

( * ) Notice: Subject to any disclaimer, the term of this patent is extended or adjusted under 35 U.S.C. 154(b) by 0 days.

(21) Appl. No.: 18/792,352

(22) Filed: Aug. 1, 2024

Related U.S. Application Data

(60) Provisional application No. 63/566,117, filed on Mar. 15, 2024.

(51) Int. Cl.
*B65G 47/46* (2006.01)
*G01V 5/226* (2024.01)

(52) U.S. Cl.
CPC ............. *B65G 47/46* (2013.01); *G01V 5/226* (2024.01); *B65G 2203/0208* (2013.01)

(58) Field of Classification Search
CPC .... G01G 19/387; B65G 47/46; B65G 47/766; B65G 67/24; B65G 13/02; B65G 67/08; B65G 43/10; B65G 43/08; B65G 47/681; B65G 2203/0208; B65G 2201/0264; B65G 2201/0258; B65G 43/02; B65G 47/82; B65G 43/00; B65G 2203/042; B65G 2207/30; B65G 2201/0235; B65G 2203/044; B65G 2201/0285; B60P 1/52; B64F 1/368; B07C 5/36; B07C 5/361; B07C 5/362; B07C 5/10; B07C 5/02; B07C 1/00; G01M 7/00; G01M 5/0066; G01N 23/18; G01N 23/04; G01N 23/083; G01N 2223/643; G01N 33/0081; G01N 33/12; G01N 23/046; G01N 2223/419; G01N 23/10; G01N 2201/102; G01N 2201/1235; G01N 23/20083; G01N 2223/3304; G01N 2223/421; G01N 2223/3308; G01N 2223/3307; G01N 2223/639; G01N 2223/401; G01N 2223/5015; G01N 23/02;
(Continued)

(56) References Cited

U.S. PATENT DOCUMENTS

| 9,014,425 | B2* | 4/2015 | Perron ................... G06V 20/52 |
| | | | 250/358.1 |
| 2009/0000908 | A1* | 1/2009 | Brain ................ H01L 21/67715 |
| | | | 700/226 |

(Continued)

FOREIGN PATENT DOCUMENTS

DE 102012201641 A1 * 8/2013 ............. B65G 23/00

*Primary Examiner* — Irakli Kiknadze
(74) *Attorney, Agent, or Firm* — TraskBritt

(57) ABSTRACT

A security lane for security checkpoint includes an x-ray scanner system, a conveyor system, and a side buffer. The x-ray scanner system may be configured to determine threat status of items at least partially based on image data of the item; The conveyor system may be configured to move items along a primary path and move items along a secondary path. The side buffer may be configured to move items on and off the primary path of the conveyor system, and to move items on and off the secondary path of the conveyor system.

24 Claims, 50 Drawing Sheets

(58) Field of Classification Search
CPC .............. G01N 2223/66; A22C 17/002; A22C 17/0086; A22C 25/18; G01B 11/24; G06N 3/08; G01V 5/226; G01V 5/224; G01V 5/22; G01V 5/222; G01V 5/223; G01T 1/2985; G01T 1/1642; G01T 1/249; G01T 1/246; G01T 1/247; A61B 6/58; A61B 6/4435; A61B 6/037; A61B 6/035; A61B 6/54; A61B 6/032; A61B 6/107; A61B 6/027; G06V 20/20; G06V 2201/05; G06V 20/52; G06Q 50/265; G06Q 10/0832; G06T 7/0002; G06T 2207/10081; G06T 2207/30112; G06T 7/12; G06T 7/187; G06T 7/143; G21F 1/08; G21F 7/00; G21F 1/10; G21F 3/00; H01J 35/045; H01J 35/04; H01J 2235/068
USPC .......................................................... 378/57
See application file for complete search history.

(56) References Cited

U.S. PATENT DOCUMENTS

| | | | |
|---|---|---|---|
| 2012/0160638 A1* | 6/2012 | Baker ..................... | B64F 1/368 198/523 |
| 2014/0376692 A1* | 12/2014 | Schafer ................... | G01V 5/22 378/57 |
| 2020/0148483 A1* | 5/2020 | Seifert ................. | B65G 47/681 |
| 2021/0370352 A1* | 12/2021 | Rottland .................. | B07C 5/10 |
| 2024/0183705 A1* | 6/2024 | Takata ................. | G01G 19/387 |

* cited by examiner

ONE INPUT TO MANY INPUT PATHS TO MANY DETECTORS

US 12,428,241 B1

BYPASS OF ITEMS IN A SECURITY LANE OF A SECURITY CHECKPOINT

CROSS-REFERENCE TO RELATED APPLICATION

This application claims the benefit under 35 U.S.C. § 119(e) of U.S. Provisional Patent Application Ser. No. 63/566,117, filed Mar. 15, 2024, the disclosure of which is hereby incorporated herein in its entirety by this reference.

TECHNICAL FIELD

One or more embodiments relate to a security lane of a security checkpoint and bypass of items therein.

BACKGROUND

Threat screening of items is performed at security checkpoints in airports, cargo screening facilities, and other sites.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
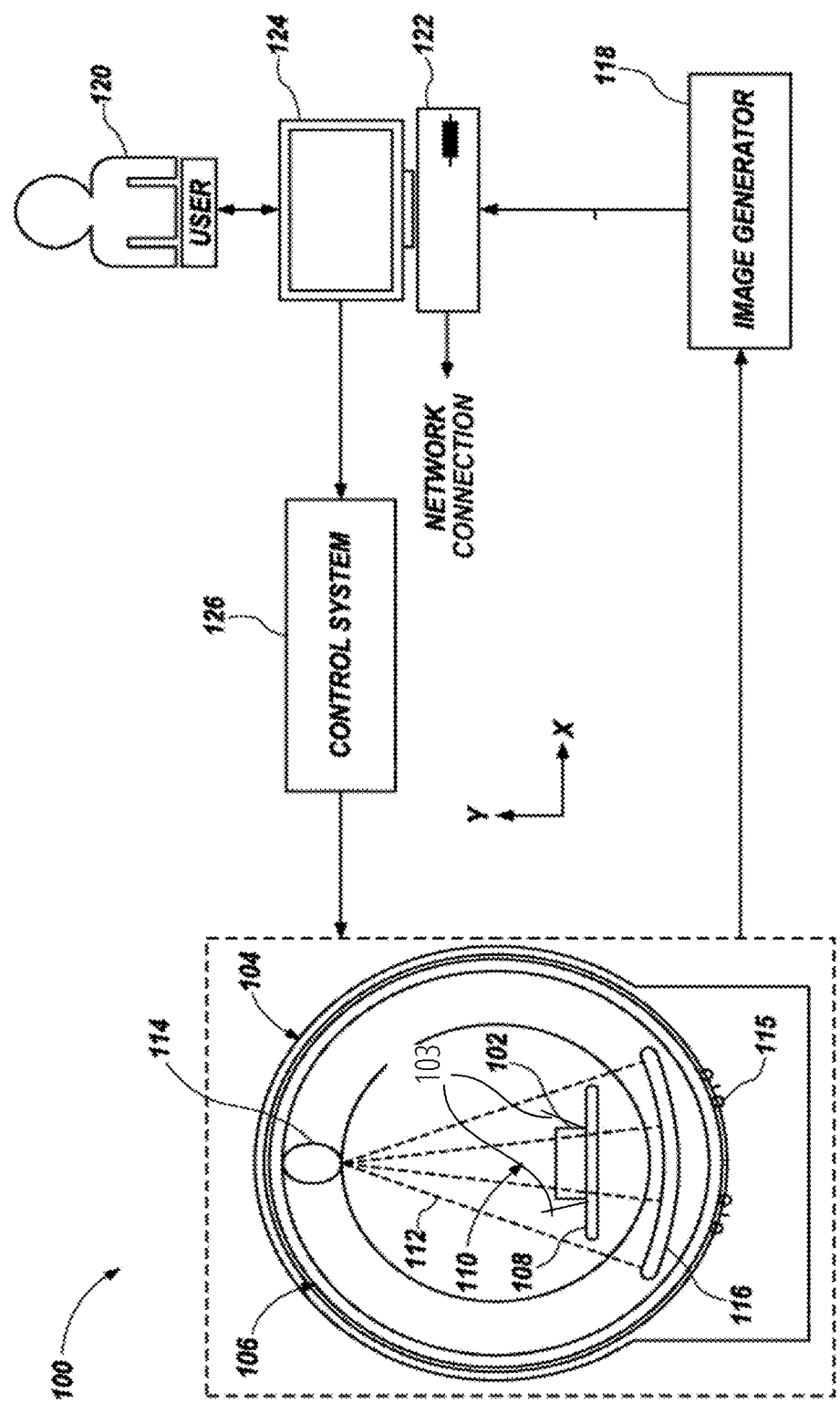
FIG. 1 is a diagram depicting an x-ray scanner system configured to perform CT scanning.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device or controller (e.g., Programmable Logic Controller (PLC), without limitation), discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a FPGA and a microprocessor, a plurality of microprocessors or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, any relational term, such as "over," "under," "on," "underlying," "upper," "lower," without limitation, is used for clarity and convenience in understanding the disclosure and accompanying drawings and does not connote or depend on any specific preference, orientation, or order, except where the context clearly indicates otherwise.

In this description the term "coupled," and derivatives thereof, may be used to indicate that two elements cooperate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The term "connected" may be used in this description interchangeably with the term "coupled," and has the same meaning unless expressly indicated otherwise or the context would indicate otherwise to a person having ordinary skill in the art.

FIG. 1 is a diagram depicting an x-ray scanner system 100 configured to perform CT scanning. Techniques in accordance with this disclosure may find applicability with, as non-limiting examples: CT systems, line-scan systems, X-ray projection systems, X-ray diffraction systems, and/or other systems comprising a radiation detector system.

Figure 2:
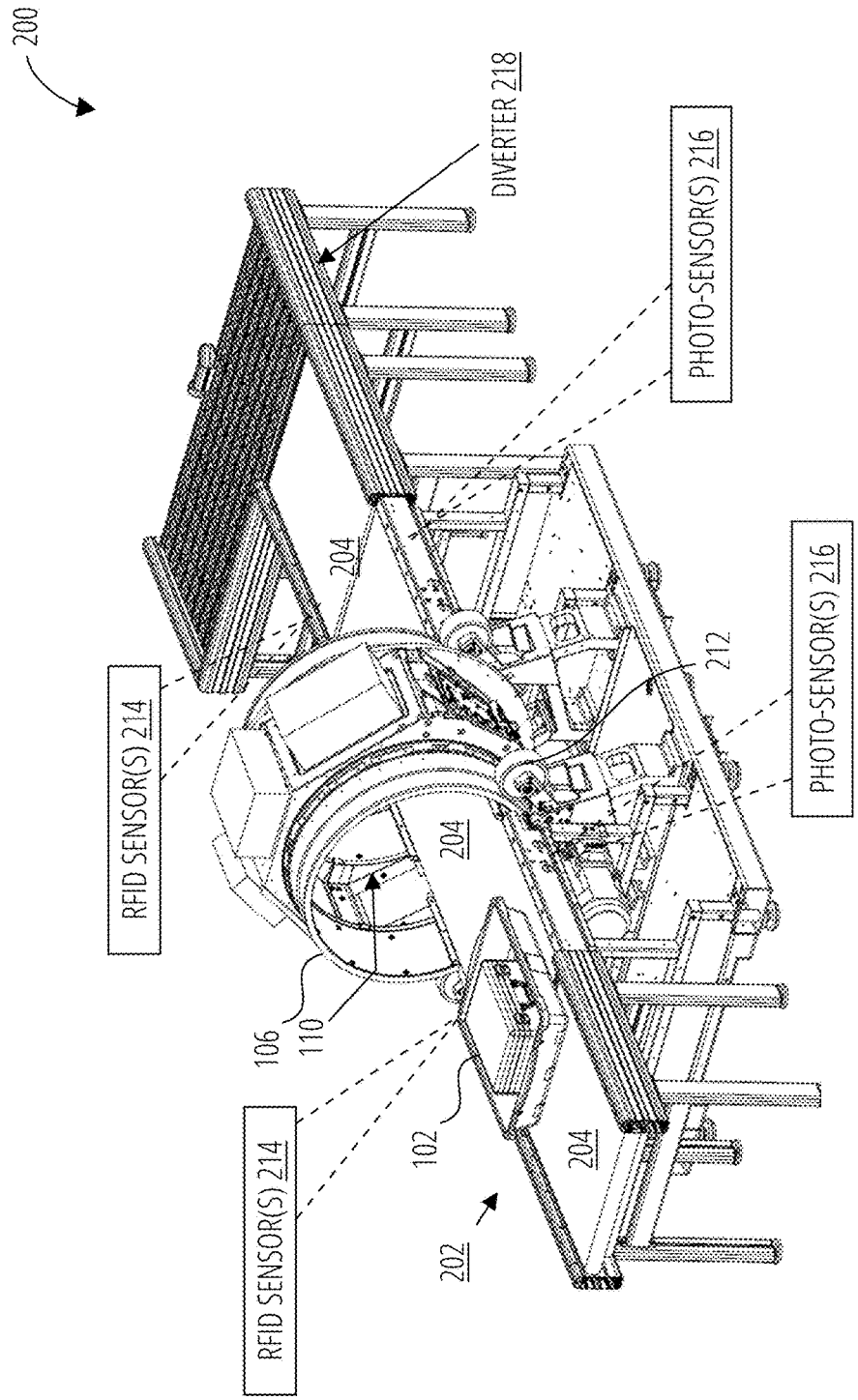
FIG. 2 is a perspective side view of a security baggage system that includes an x-ray scanner system 100 of FIG. 1.

The x-ray scanner system 100 may be configured to examine an object 102 (e.g., one or more objects 102 such as a collection or series of objects, such as luggage at an airport, freight, or parcels, without limitation). The x-ray scanner system 100 may include, for example, a stator 104 and a rotor 106 rotatable relative to the stator 104. During an examination, object 102 may be placed in a radiolucent tray 103 located on a support 108. Non-limiting examples of a support 108 include one or more of a table, bed, conveyor belt, or rollers. A portion of the support 108 including the object 102 may be selectively positioned in an examination region 110 (e.g., a hollow bore in the rotor 106 in which an object(s) 102 is exposed to radiation 112, without limitation), and the rotor 106 may be rotated about the object(s) 102 and tray 103 by a rotator 115 (e.g., motor, drive shaft, drive belt, without limitation) as depicted by FIG. 2.

The rotor 106 may surround at least a portion of the examination region 110 (some or a totality of the examination region 110) and may be configured as, for example, a gantry supporting at least one radiation source 114 (e.g., an ionizing X-ray source, gamma-ray source, without limitation) oriented to emit radiation toward the examination region 110 and at least one radiation detector 116 (x-ray scanner system 100 may include one or more radiation detectors 116), without limitation, supported on a substantially diametrically opposite side of the rotor 106 relative to the radiation source 114. During an examination of object 102, the radiation source 114 emit shaped radiation 112 (e.g., radiation exhibiting a fan shaped configuration, cone shaped configuration, or both without limitation) toward and into the examination region 110. The radiation 112 may be emitted, as a non-limiting example, at least substantially continuously or intermittently (e.g., a pulse of radiation 112 followed by a resting period during which the radiation source 114 is not activated, and optionally followed by a further pulse of radiation 112, without limitation).

As the emitted radiation 112 traverses object 102 and tray 103, the radiation 112 may be attenuated differently by different aspects of object 102 and tray 103. Because different aspects attenuate different percentages of the radiation 112, an image or images can be generated based upon the attenuation, or variations in the number of radiation photons that are detected by radiation detector 116. For example, more dense aspects of the object 102, such as an inorganic material, may attenuate more of the emitted radiation 112 (e.g., causing fewer photons to be detected by the radiation detector 116, without limitation) than less dense aspects, such as an organic material.

The radiation detector 116 may include, for example, many individual detector elements arranged in a pattern (e.g., a row or an array, without limitation) on one or more detection assemblies (also referred to as detection modules, detector modules, and/or the like), which are operatively connected to one another to form the radiation detector 116. In one or more embodiments, the detector elements may be configured to convert, directly or indirectly, (e.g., using a scintillator array and photodetectors) detected radiation into analog signals. Further, as described below, the radiation detector 116, or detection assemblies thereof, may comprise electronic circuits, such as, for example, an analog-to-digital (A/D) converter, configured to filter the analog signals, digitize the analog signals, and/or otherwise process the analog signals and/or digital signals generated thereby. Digital signals output from the electronic circuits may be conveyed from the radiation detector 116 to digital processing components configured to store data associated with the digital signals and/or further process the digital signals.

In some embodiments, the digital signals may be transmitted to an image generator 118 configured to generate image space data, also referred to as "images," from the digital signals using a suitable analytical, iterative, and/or other reconstruction technique (e.g., back-projection reconstruction, tomosynthesis reconstruction, iterative reconstruction, without limitation). In this way, the data associated with the digital signals may be converted from projection space to image space, a domain that may be more understandable by a user 120 viewing the image(s), for example. Such image space data may, as non-limiting examples, depict a two-dimensional representation of the object 102 and/or a three-dimensional representation of the object 102. In other embodiments, the digital signals, images, or both may be transmitted to other digital processing components, such as a threat analyzer, for processing.

X-ray scanner system 100 may also include, or be connected to (e.g., via a network connection, without limitation), a terminal 122 (e.g., a workstation, desktop or laptop computer, or other computing device, without limitation), configured to receive the image(s) (e.g., images generated by image generator 118, without limitation), which may be displayed on a monitor 124 to the user 120 (e.g., security personnel, medical personnel, without limitation).

In this way, the image(s) are inspectable by a threat analyzer (e.g., a user, a digital processing component, or both, without limitation) to identify areas of interest within object 102. The terminal 122 may be configured to receive user input which may direct operations of the x-ray scanner system 100 (e.g., a rate at which the support 108 moves, activation of the radiation source 114, without limitation). The terminal 122 may be coupled to additional terminals 122 via a network (e.g., via a local area network or the Internet, without limitation).

A control system 126 may be operably coupled to the terminal 122. The control system 126 may be configured to control, automatically and dynamically, (e.g., via command signals generated by control system 126, without limitation) at least some operations of the x-ray scanner system 100 (e.g., at least partially responsive to a user input, at least partially responsive to sensor data about operation of x-ray scanner system 100, or both, without limitation). As a non-limiting example, the control system 126 may be configured to control, automatically and dynamically, the rate at which the support 108 moves through the examination region 110, the rate at which support 108 translates objects through examination region 110, the rate at which the rotor 106 rotates (e.g., about axis of rotation 210 in FIG. 2, without limitation) relative to the stator 104, activation, deactivation, and output level of (e.g., intensity of radiation emitted by) the radiation source 114, or any combination or subcombination of these operating parameters. In one or more embodiments, the control system 126 may also accept manual override instructions from the terminal 122 (e.g., via user input, without limitation) and to issue instructions to the x-ray scanner system 100 to alter the operating parameters of the scanning system based on the manual override instructions. In one or more examples, x-ray scanner system 100 may include a measurement system for estimating weight, size, shape of object 102, as discussed below.

FIG. 2 is a perspective side view of a security baggage system 200 that includes an x-ray scanner system 100 of FIG. 1. Security baggage system 200 and x-ray scanner system 100 are specifically configured as a baggage, cargo, and threat/contraband detection system (such as one or more of an explosive detection system, weapon detection system, drug detection system, without limitation). Security baggage system 200 may form a portion of example security lanes discussed herein.

The support 108 of the illustrated x-ray scanner system 100 may be configured as a conveyor system 202 configured to move objects 102 in the form of baggage, parcels, or other items located in tray 103 or on the diverter 206. Objects 102 passing through the examination region 110 of the x-ray scanner system 100 are imaged using a helical scan, axial scans, or projection scans, without limitation.

The x-ray scanner system 100 may include a rotation subsystem rotation subsystem 212 (e.g., motor, drive shaft, drive belt, without limitation) configured to drive rotation of the rotor 106, and the radiation source 114 and radiation detector 116 supported thereon, relative to the stator 104. The rotator rotation subsystem 212 specifically shown in FIG. 2 is configured as a motor with a belt or drive wheel mechanically engaged with the rotor 106 to cause the rotor 106 to rotate in response to movement of the motor and drive wheel. The speed of the rotator rotation subsystem 212 may control the rotational rate at which the rotor 106 moves the radiation source 114 and radiation detector 116 supported thereby. The control system 126 may issue command signals transmitted to the rotator 115 (e.g., via a wireless or wired connection) to vary the speed of the motor and associated belt. The x-ray scanner system 100 may also include shields, which may include a radiation-blocking material (e.g., Lead or Tungsten) for reducing the likelihood that radiation emitted by the radiation source 114 may propagate beyond the rotor 106 and/or stator 104.

The conveyor system 202 may include, for example, a conveyor belt and/or rollers for supporting and transporting the objects 102. The speed of the motor may control the linear rate at which the belt transports the objects 102, photo-sensor(s) 216 for determining the presence of an object on a conveyor, and Radio Frequency Identification (RFID) sensors 214 that uniquely identify trays that include one or more RFID tags. Quantities and locations of RFID sensor(s) 214 and photo-sensor(s) 216 in FIG. 2 are exemplary, only, and not intended to limit the scope. The belt and/or motors may be driven by a motor. The speed of the motor may control the linear rate at which the belt transports the objects 102 supported thereon may proceed through the examination region 110 in the forward or backwards direction. The control system 126 may issue command signals transmitted to the motor (e.g., via a wireless connection, wired connection, or both without limitation) to vary (e.g., increase or decrease, without limitation) the speed of the motor and associated belt. The conveyor system 202 may include, for example, several individual respective conveyors 204 (e.g., one conveyor 204 extending through the examination region 110, another conveyor 204 configured to convey objects 102 toward the x-ray scanner system 100, another conveyor 204 configured to convey objects 102 away from the x-ray scanner system 100, without limitation), and a diverter 206 configured to move objects from one conveyor section to an adjacent section; however, other forms of conveyor systems may be used with exceeding the scope. The different conveyors 204 may be operated at different speeds in accordance with instructions issued by the control system 126.

The x-ray scanner system 100 may include a rotation subsystem 216 (e.g., motor, drive shaft, drive belt, without limitation) configured to drive rotation of the rotor 106, and the radiation source 114 and radiation detector 116 supported thereon, relative to the stator 104. The rotator rotation subsystem 212 specifically shown in FIG. 2 is configured as a motor with a belt or drive wheel mechanically engaged with the rotor 106 to cause the rotor 106 to rotate in response to movement of the motor and drive wheel. The speed of the rotator rotation subsystem 212 may control the rotational rate at which the rotor 106 moves the radiation source 114 and radiation detector 116 supported thereby. The control system 126 may issue command signals transmitted to the rotator 115 (e.g., via a wireless or wired connection) to vary the speed of the motor and associated belt. The x-ray scanner system 100 may also include shields, which may include a radiation-blocking material (e.g., Lead or Tungsten) for reducing the likelihood that radiation emitted by the radiation source 114 may propagate beyond the rotor 106 and/or stator 104.

Sets of rollers 204 are arranged in a frame to define a roller bed. In one or more examples, the roller bed supports tray(s) using multiple wheels or a conveyor belt, and may be powered by a motor. The specific non-limiting example tray(s) 103 are a type of free standing support (e.g., container, without limitation) that may be manually removed from the conveyor, placed on the conveyor, or re-arranged on the conveyor, though this disclosure is not limited to free stranding supports and supports that are not free standing such as built-in-support, without limitation, are specifically contemplated.

Figure 3:
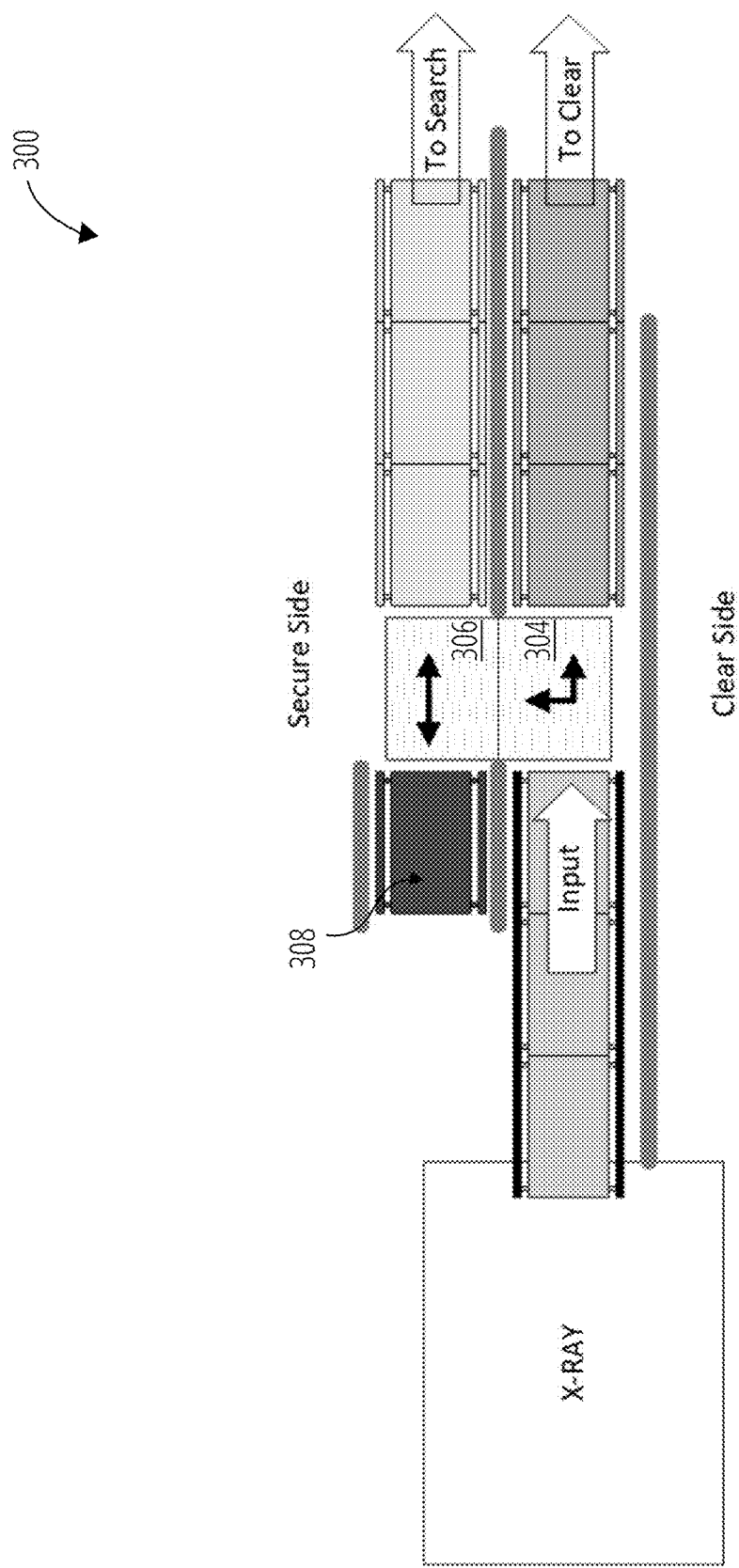
FIG. 3 is a schematic diagram of a typical security lane at a security checkpoint, in accordance with the state of the art.

FIG. 3 is a schematic diagram depicting a traditional security lane 300 having a diverter to suspect configuration, in accordance with the state of the art known to the inventors of this disclosure.

Traditional Security lane 300 includes an x-ray scanner system, a primary path to the clear area, a secondary path to the search area, and high threat holding area 308. A "clear area" or "clear" generally refers to an area for items that passed a security screening process without detected threats or reason for further inspection.

Security lane 300 includes a diverter with cell 306 and cell 304, arranged vertically adjacent so that cell 304 is in a portion of the primary path of the conveyor system and cell 306 forms a portion of the secondary path of the conveyor system.

Respective cells 304 and 306 include diverter to facilitate movement of items positioned therein. Cell 304 is configured to facilitate movement of an item to cell 306 or along a primary path toward the clear area. Cell 306 is configured to facilitate movement of an item to high threat holding area 308 or along a secondary path toward the search area. Notably, cell 306 is not configured to facilitate movement of an item to cell 304.

One or more examples relate to a security baggage system for an airport security checkpoint (e.g., a security baggage system may also be referred to herein as a "security lane") that includes one or more side buffers. A side buffer may include a section of a security lane (e.g., a section of a conveyor system, without limitation) and control logic that implement a holding area for items. Other items that passed through an x-ray scanner system of the security lane after (e.g., in time or sequential order, without limitation) the held item, may physically pass the held item into a clear area (e.g., for collection by passengers, without limitation) or a search area (e.g., to be searched by security personnel, without limitation). In one or more embodiments, a holding area is an enhancement that improves the efficiency and throughput of the security screening process as compared to typical security lanes.

In one or more examples, diversion is discussed with respect to diversion from a primary path to a secondary path or to holding area. In one or more examples, including those discussed with respect FIG. 4 to FIG. 8 and FIG. 18 to FIG. 48, the primary path is the path to the clear area, and the secondary path is the path to the search area, however this disclosure is not so limited. Examples where the primary path is the path to the search area and the secondary path is the path to the clear area are specifically contemplated and do not exceed the scope of this disclosure. A person having ordinary skill in the art apprised of this disclosure would appreciate various modifications to the examples discussed herein, including with respect to FIG. 4 to FIG. 8 and FIG. 18 to FIG. 48, to implement examples where the primary path is the path to the search area and the secondary path is the path to the clear area.

A side buffer allows certain items to be "parked" (e.g., at least temporarily, without limitation) in a holding area. This is particularly useful when an item's threat status is pending (e.g., waiting for clearance or to be identified as a potential threat, without limitation), but is not immediately blocking the line of items. Subsequent items may not be delayed by an item requiring additional screening or more time to complete screening (e.g., more time for a threat analyzer to process image data, without limitation). Utilization of a holding area may reduce the bottleneck effect commonly seen in typical security lanes.

In one or more embodiments, a holding area is a section of a security lane configured to receive, hold, and provide items.

In one or more embodiments, a respective holding area may optionally be configured to retain an item until a threat is resolved (e.g., suitably resolved, without limitation). Such an item may be one previously identified as requiring additional verification before it can be handled. By way of non-limiting example, such a hazardous or otherwise dangerous item (also referred to herein as a "high threat item") may be flagged as requiring additional verification before it can be accessed and/or removed from the holding area. An item flagged as a high threat item may be diverted to a high threat holding area.

In one or more embodiments, a security lane may include multiple holding areas. By including multiple holding areas, the control logic can more effectively manage a variety of scenarios and items needing different levels of attention without increasing bottlenecks. Items may be moved between these areas as needed, allowing for a more customized approach to handling each item's security process.

In traditional security lanes, items are processed and advanced to the clear area in the order they arrive at the security baggage system. With holding areas, the control logic can rearrange the order of items at least partially based on priority (e.g., threat-based priority, without limitation), waiting time, to keep items together, or other criteria.

Examples may exhibit an increase in throughput of the security screening process as compared to traditional security lanes. By reducing wait times for subsequent items and managing multiple items more effectively, a security lane, and thus a security checkpoint, in accordance with one or more examples herein may handle a higher volume of passengers and baggage (as compared to traditional security lanes and security checkpoints), improving efficiency and potentially enhanced passenger and airline satisfaction, and reducing costs.

This enhancement to security lanes and security checkpoints is a significant innovation in managing the flow and screening of items. By addressing the common bottlenecks and allowing for a more fluid movement of items through the security process, airports can ensure a smoother, faster screening experience while maintaining (or even increasing) high security standards.

Diverter Mechanism

To move high-threat items into a holding area while allowing other items to continue to the clear area uninterrupted, a combination of mechanisms (e.g., mechanical, electronic, smart, automated, or combinations thereof, without limitation) may be utilized in a conveyor system of a security lane.

In some examples, a pusher bar may be utilized to move an item toward or to a holding area. A pusher bar or paddle extends or swings (e.g., from the side of the conveyor, without limitation) to push an item from a cell or path to another cell or path (e.g., toward a holding area, without limitation), while other items continue on the primary path.

In some examples, lift-up transfer conveyor may be utilized to move an item toward or to a holding area. These are one or more of: belts, rollers, or wheels-respectively embedded in a conveyor surface configured to lift to change the direction of the movement of an item, guiding it to the holding area. When not activated, they remain below the conveyor surface.

In some examples, swivel wheels may be utilized to move an item toward or to a holding area. These systems rotate a wheel or roller to change the direction of the movement of an item, guiding it forward or to a holding area.

In some examples, turntables or rotary tables may be utilized to move an item toward or to a holding area. These are platforms configured to rotate to change the direction of an item. An item is moved onto the table, which rotates to orient the item towards the holding area. The conveyor system moves the item on the rotated table toward the holding area or another mechanism can push, shove, or otherwise urge the object toward the holding area.

The specific diverter mechanism(s) implemented in a security lane in accordance with one or more embodiments may be at least partially based on specific operating conditions. For example, the choice of mechanism may depend on factors such as one or more of: the size and weight of items typically handled, the speed of the conveyor, spatial and geometric constraints, and the desired level of precision and gentleness in handling the items.

In one or more embodiments, respective diverter mechanisms are controlled by diverter logic of the security lane. The diverter logic activates the appropriate response based on item's identified threat level.

Bypass Control Logic

The bypass control logic for the security checkpoint's baggage system adds a sophisticated layer of item management based on threat detection and item diversion.

As items pass through the security baggage scanner, they are analyzed for potential threats. Respective items might be identified as "threat" due to various reasons, including the presence of prohibited items, suspicious density or shapes, or other security triggers. The threat analyzer is configured to communicate the item threat status, for example tagging the item with a status identifier (e.g., associating a unique identifier for the item with the status identifier) that corresponds to a determined threat status. The status identifier may also indicate that a threat level is unknown, unassigned, or that an item is otherwise waiting to be assigned a threat level.

In one or more embodiments, respective items, or trays carrying the items, passing through the security lane may be tagged with an RFID or other mechanism for identification. The RFID contains an ID that can be matched with the threat detection system. When an item is flagged as a threat, its status identifier is matched with its unique ID for further action.

The bypass control logic includes diverter logic. The diverter logic activates a diverter mechanism in response to an indication that an item associated with a threat status identifier is in a section of the security lane where it can be redirected toward a holding area. In one or more embodiments, the section may include a reader configured to read the RFID of the item and provide the read RFID to the diverter logic. The diverter logic compares the RFID to a list of RFIDs with a threat status identifier, and, in response to determining a match, activates the diverter. This part of the system redirects the item away from the primary path of the security lane to a holding area.

The diverter logic sends an instruction to the conveyor system, prompting it to move the threat item to a designated holding area. This involves controlling various conveyor mechanisms, such as belts, rollers, or diverter mechanisms, to guide the item from its current position or section to the holding area.

As discussed above, the holding area may be a waiting area that is accessible to security personnel or passengers or may be more robust, such as a secure space where threat items are isolated to await the results of screen or for further screening (e.g., further threat analysis, without limitation).

By integrating these components-security scanning, item identification, diverting mechanisms, and dedicated holding areas-a side buffer in accordance with various examples discussed herein may enhance the security and efficiency of the baggage screening process. It allows for rapid, automated response to potential threats, reducing the risk of dangerous items proceeding unchecked without (or negligibly) impeding the flow of cleared items.

FIG. 4, FIG. 4, FIG. 5, FIG. 6, FIG. 7 and FIG. 8 are schematic diagrams that illustrate various example configurations of security lanes, in accordance with one or more embodiments.

Respective security lanes depicted by FIG. 4 to FIG. 8 include side buffer having various configurations. Respective side buffers include cells that correspond to portions of the conveyor system that are individually controllable to facilitate movement in the directions depicted by the arrows in respective cells. Respective cells may include diverters (diverter mechanisms) discussed above to facilitate movement in the various directions indicated by the arrows drawn in the respective cells. Motions can be performed, without limitation, in the forward and back direction and at 90 degrees to the conveyor, and for systems with more than one side buffer, at oblique angles.

Control logic may be configured to implement one or more holding areas utilizing side buffers and respective cells thereof as discussed herein. In one or more examples, the control logic may include a side buffer object with respective cell objects (e.g., implemented in software and/or hardware circuitry, without limitation), as non-limiting examples, which corresponds to the cell arrangements depicted in FIG. 4 to FIG. 8 of respective side buffers. In one or more embodiments, a respective cell objects may include information such as a cell identifier, an item identifier, and identifiers of cells or outputs of the side buffer to which an item may be moved. In some embodiments, cell objects may include information about sections of a conveyor system to which an output of the side buffer is connected. As a non-limiting example, information indicating that a first output is connected to a primary path of the conveyor system, a second output is connected to a secondary path of the conveyor system, and a third output is connected to a high threat holding area of the security line.

Figure 4:
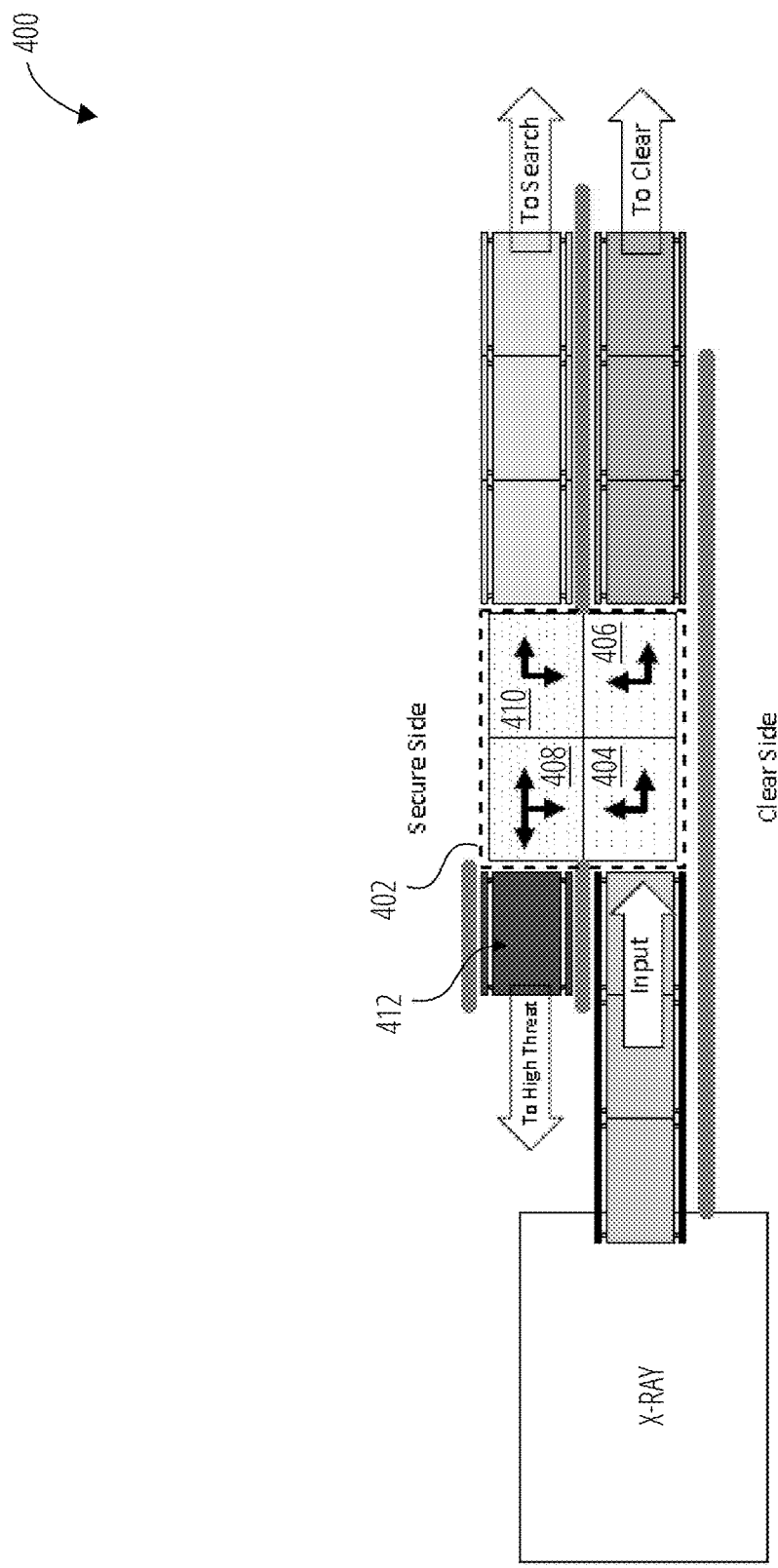
FIG. 4, FIG. 5, FIG. 6, FIG. 7 and FIG. 8 illustrate various configurations of security lanes, in accordance with one or more embodiments.

FIG. 4 is a schematic diagram depicting a security lane 400 having a 2×2 configuration, in accordance with one or more embodiments.

Security lane 400 includes detection, a primary path to the clear area, a secondary path to the search area, a side buffer 402, and a high threat holding area 412.

Side buffer 402 is a 2×2 side buffer that includes four cells, cell 404, cell 406, cell 408 and cell 410. Side buffer 402 includes outputs respectively connected to high threat holding area 412, a primary path of a conveyor system, and a secondary path of a conveyor system. Side buffer 402 includes an input connected to a portion of a primary path of the conveyor system that receives items exiting detection (different than the portion of the primary path connected to one of the outputs of side buffer 402).

The four cells are organized in a layout where a respective cell is directly adjacent to at least one other respective cell, both horizontally and vertically. This configuration forms a square-like structure, ensuring that a respective cell shares a side with its neighbor, creating a 2×2 grid pattern.

Cell 404 and cell 408 are arranged vertically adjacent so that cell 404 forms a portion of the primary path of the conveyor system and cell 408 forms a portion of the secondary path of the conveyor system. Cell 406 and cell 410 are arranged vertically adjacent so that cell 406 forms a portion of the primary path of the conveyor system and cell 410 forms a portion of the secondary path of the conveyor system. The pair of cells 404/408 and the pair of cells 406/410 are arranged horizontally adjacent as depicted by FIG. 4.

Respective ones of cell 404, cell 406, cell 408 and cell 410 of side buffer 402 include diverters discussed above to facilitate movement of items in the directions indicated by the arrows drawn in the cells of FIG. 4.

Cell 404 is configured to facilitate movement of an item to cell 408 and cell 406 along a primary path of the conveyor system to the clear area. Cell 408 is configured to facilitate movement of an item to high threat holding area 412, cell 404, and cell 410. Cell 410 is configured to facilitate movement of an item to cell 406 or along a secondary path of the conveyor system toward the search area. Cell 406 is configured to facilitate movement of an item to cell 410 or along a primary path of the conveyor system toward the clear area.

Notably, the variety of movement directions facilitates shuffling of items within side buffer 402 as needed.

Long Item Support

In the case of security lanes including a side buffer having at least a 2×2 configuration (i.e., at least two rows and at least two columns such as security lane 400, security lane 500, security lane 600, security lane 700, or security lane 800, without limitation), a security lane may optionally offer long bag support. Here, a long item is any item having a length, width, or shape that exceeds the boundary of a single cell of a side-buffer. To accommodate long items, two or more adjacent cells of a bypass may be configured to operate synchronously (e.g., in terms of time and mechanics, without limitation) to cooperatively move items with respective dimensions that exceed the capacity of any single cell to manage.

As a non-limiting example, cell 404 and cell 406 may cooperatively transfer a long item to cells 408 and cell 410 or to output the long item to the primary path, cells 408 and cell 410 may cooperatively transfer the long item back to cell 404 and cell 406 or to output the long item to high threat holding area 412 or the secondary path. Any suitable technique may be utilized to active long item support depending on specific operating conditions, for example, it may be activated manually by personnel who observe a long item, by sensors that detect a long item entering or exiting a scanner or from the weight of long item on a portion of the conveyor of the primary path that feeds to a side buffer, without limitation.

Diagonal Transfer

While arrows show vertical and horizontal movement, this disclosure is not limited to transfer between cells that are vertically or horizontally adjacent. For example, transfer between cells that are diagonally adjacent is also contemplated, and does not exceed the scope of this disclosure.

Figure 5:
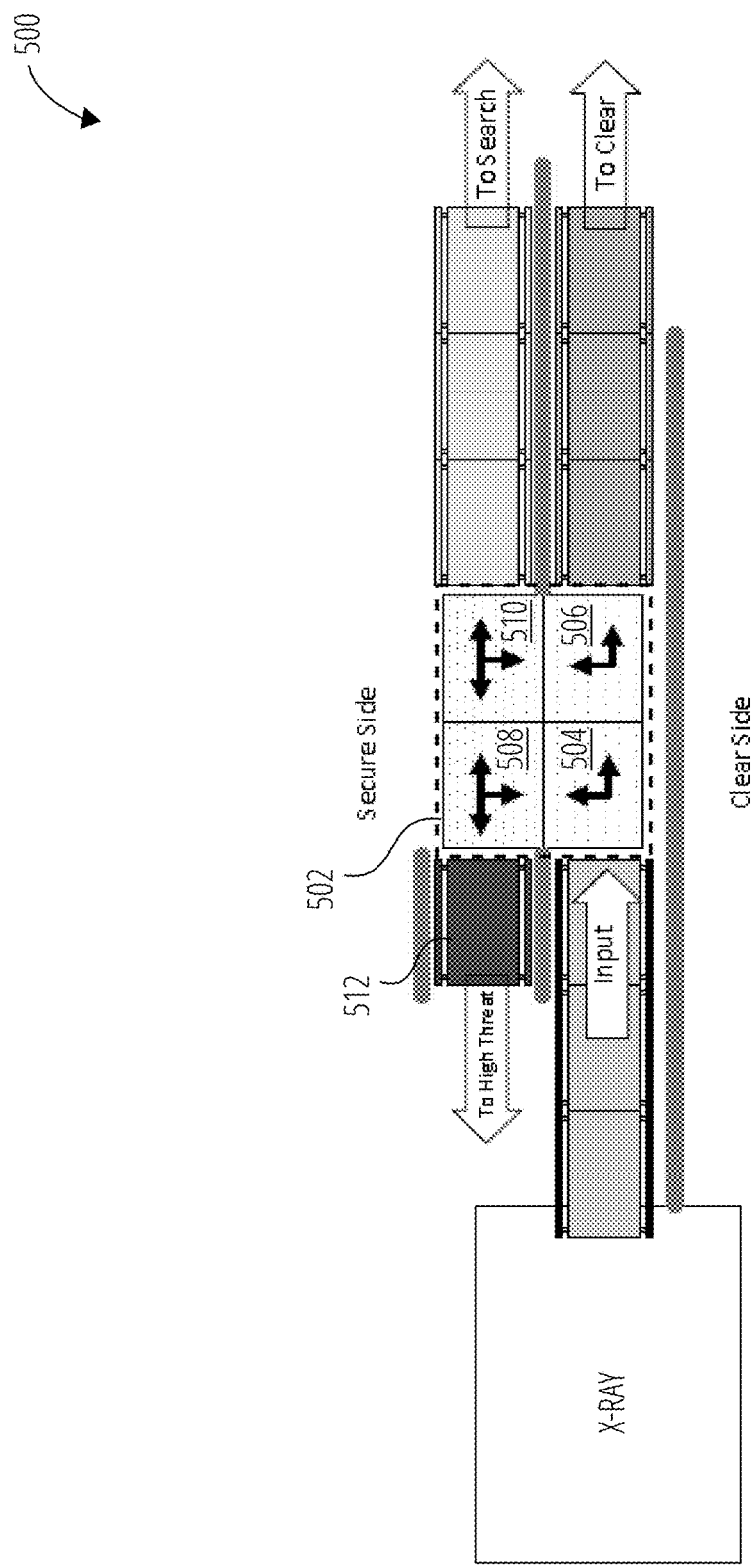

FIG. 5 is a schematic diagram depicting a security lane 500 having an alternative 2×2 configuration, in accordance with one or more embodiments.

Security lane 500 includes detection, a primary path to a clear area, a secondary path to a search area, a side buffer 502, and a high threat holding area 512.

Side buffer 502 is a 2×2 side buffer with four cells, cell 504, cell 506, cell 508 and cell 510.

Side buffer 502 includes outputs respectively connected to high threat holding area 512, a primary path of a conveyor system, and a secondary path of a conveyor system. Side buffer 502 includes an input connected to a portion of a primary path of the conveyor system that receives items exiting detection (different than the portion of the primary path connected to one of the outputs of side buffer 502).

Cell 504 and cell 508 are arranged vertically adjacent so that cell 504 forms a portion of the primary path of the conveyor system and cell 508 forms a portion of the secondary path of the conveyor system. Cell 506 and cell 510 are arranged vertically adjacent so that cell 506 forms a portion of the primary path of the conveyor system and cell 510 forms a portion of the secondary path of the conveyor system.

Respective ones of cell 504, cell 506, cell 508 and cell 510 include diverters discussed above to facilitate movement of items positioned therein in the directions discussed below.

Cell 504 is configured to facilitate movement of an item to cell 508 or cell 506. Cell 506 is configured to facilitate movement of an item to cell 510 or the primary path of the conveyor system toward the clear area. Cell 508 is configured to facilitate movement of an item to high threat holding area 512, cell 510 or cell 504. Cell 510 is configured to facilitate movement of an item along the secondary path of the conveyor system toward the search area.

Notably, the variety of movement directions facilitates shuffling of items within side buffer 502 as needed. At least some of the movements available via side buffer 502 are different than those available to side buffer 402.

Figure 6:
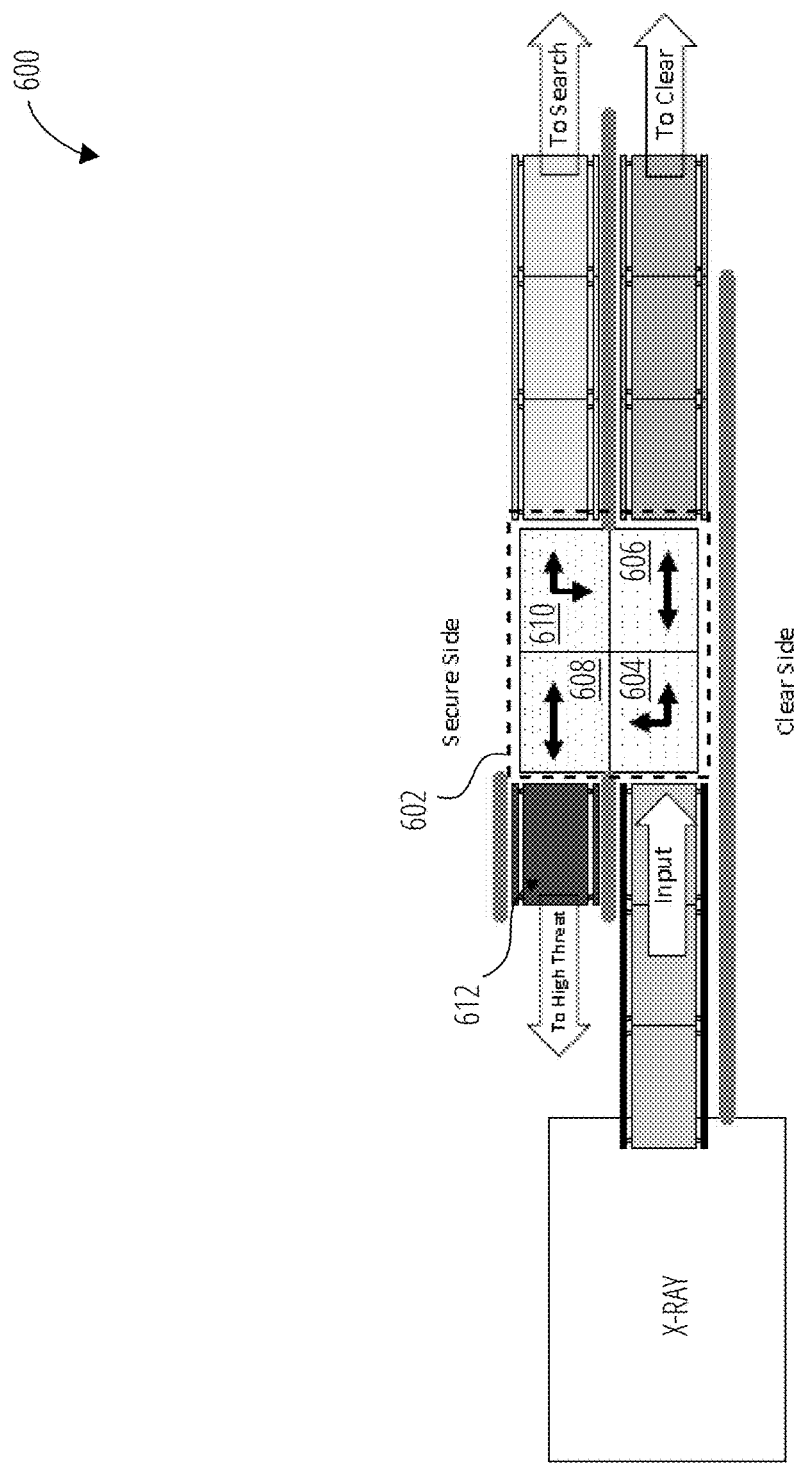

FIG. 6 is a schematic diagram depicting a security lane 600 having a further alternative 2×2 configuration, in accordance with one or more embodiments.

Security lane 600 includes detection, a primary path to a clear area, a secondary path to a search area, a side buffer 602, and a high threat holding area 612.

Side buffer 602 includes cell 604, cell 606, cell 608, and cell 610, which are arranged similarly to cell 504, cell 506, cell 508, and cell 510 of FIG. 5.

Side buffer 602 includes outputs respectively connected to high threat holding area 612, a primary path of a conveyor system, and a secondary path of a conveyor system. Side buffer 602 includes an input connected to a portion of a primary path of the conveyor system that receives items exiting detection (different than the portion of the primary path connected to one of the outputs of side buffer 602).

Respective ones of cell 604, cell 606, cell 608 and cell 610 include diverters discussed above to facilitate movement of items positioned therein in the directions discussed below.

Cell 604 is configured to facilitate movement of an item to cell 608 or cell 606. Cell 608 is configured to facilitate movement of an item to high threat holding area 612 or cell 610. Cell 606 is configured to facilitate movement of an item to cell 604 or along a primary path of conveyor system toward the clear area. Cell 610 is configured to facilitate movement of an item to cell 606 or along a secondary path of the conveyor system toward the search area.

Figure 7:
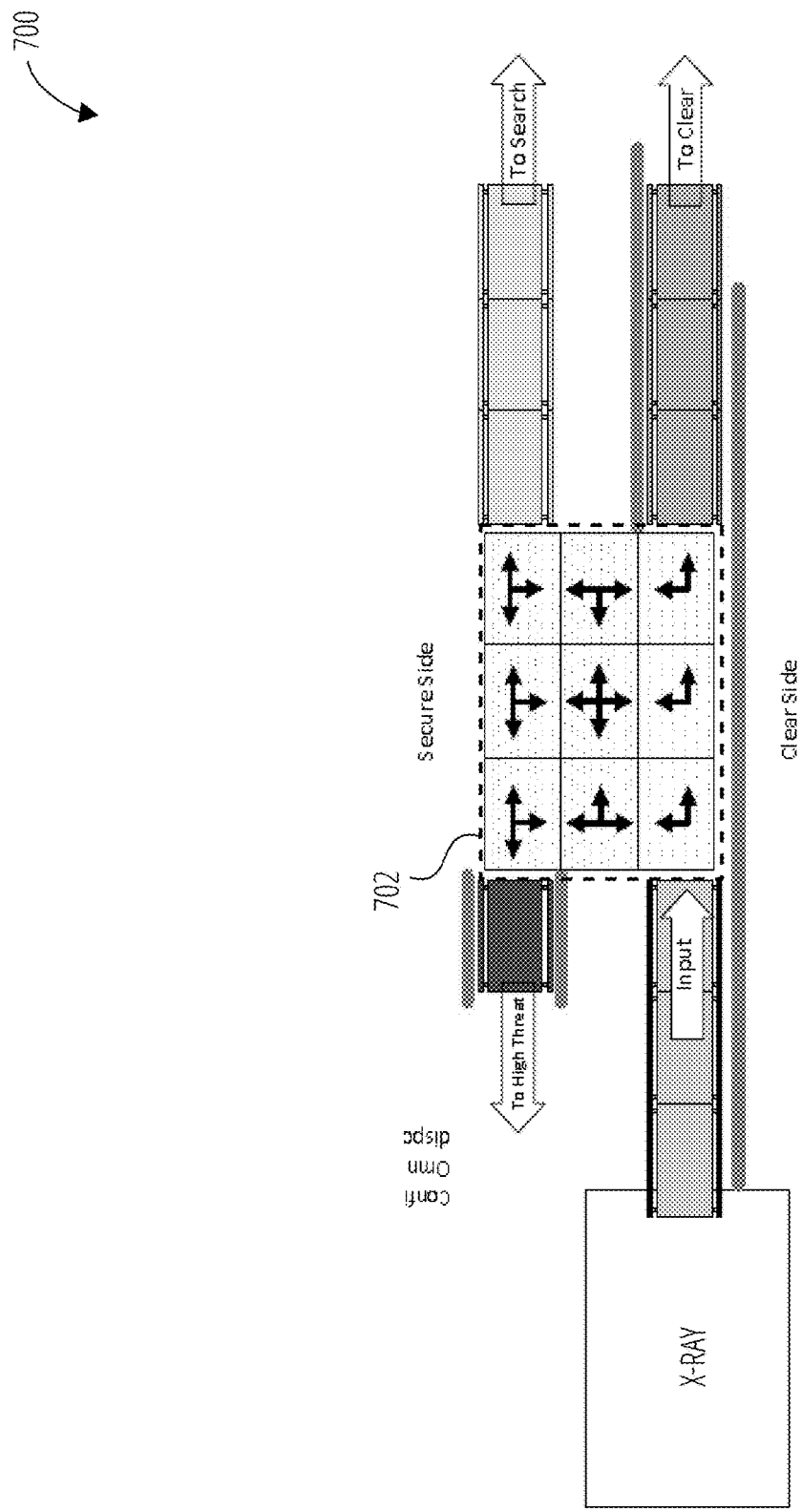

FIG. 7 is a schematic diagram depicting a security lane 700 having a 3×3 configuration, in accordance with one or more embodiments.

In FIG. 7 the side buffer 702 of the conveyor system includes multiple cells that includes diverters and are respectively configured to facilitate movement in the directions indicated by the arrows drawn in the cells. Side buffer 702 includes an input and respective outputs similar to side buffers discussed above.

Figure 8:
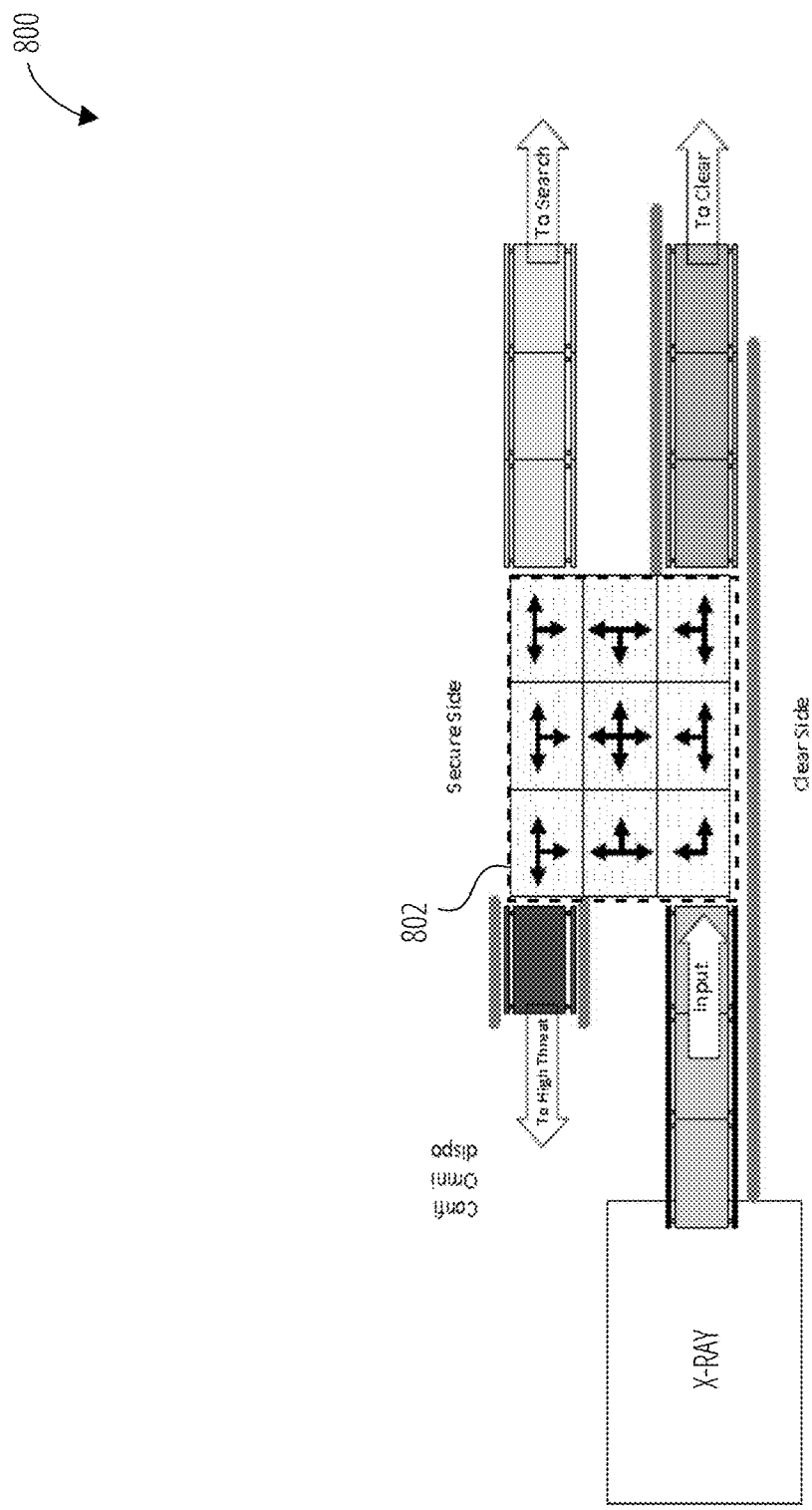

FIG. 8 is a schematic diagram depicting a security lane 800 having a 3×3 configuration, in accordance with one or more embodiments.

In FIG. 8, the side buffer 802 includes multiple (here, nine) cells that respectively include diverters. A respective cell is configured to facilitate movement in the directions indicated by the arrows drawn in the cell. Side buffer 802 includes an input and respective outputs similar to side buffers discussed above. Here, inputs include an input form a primary path, and outputs include outputs to the primary path, a secondary path, and a holding area.

FIG. 9 to FIG. 13 are flow diagrams depicting example processes related to operation of a side buffer that does not include a high threat holding area for security lane.

Figure 9:
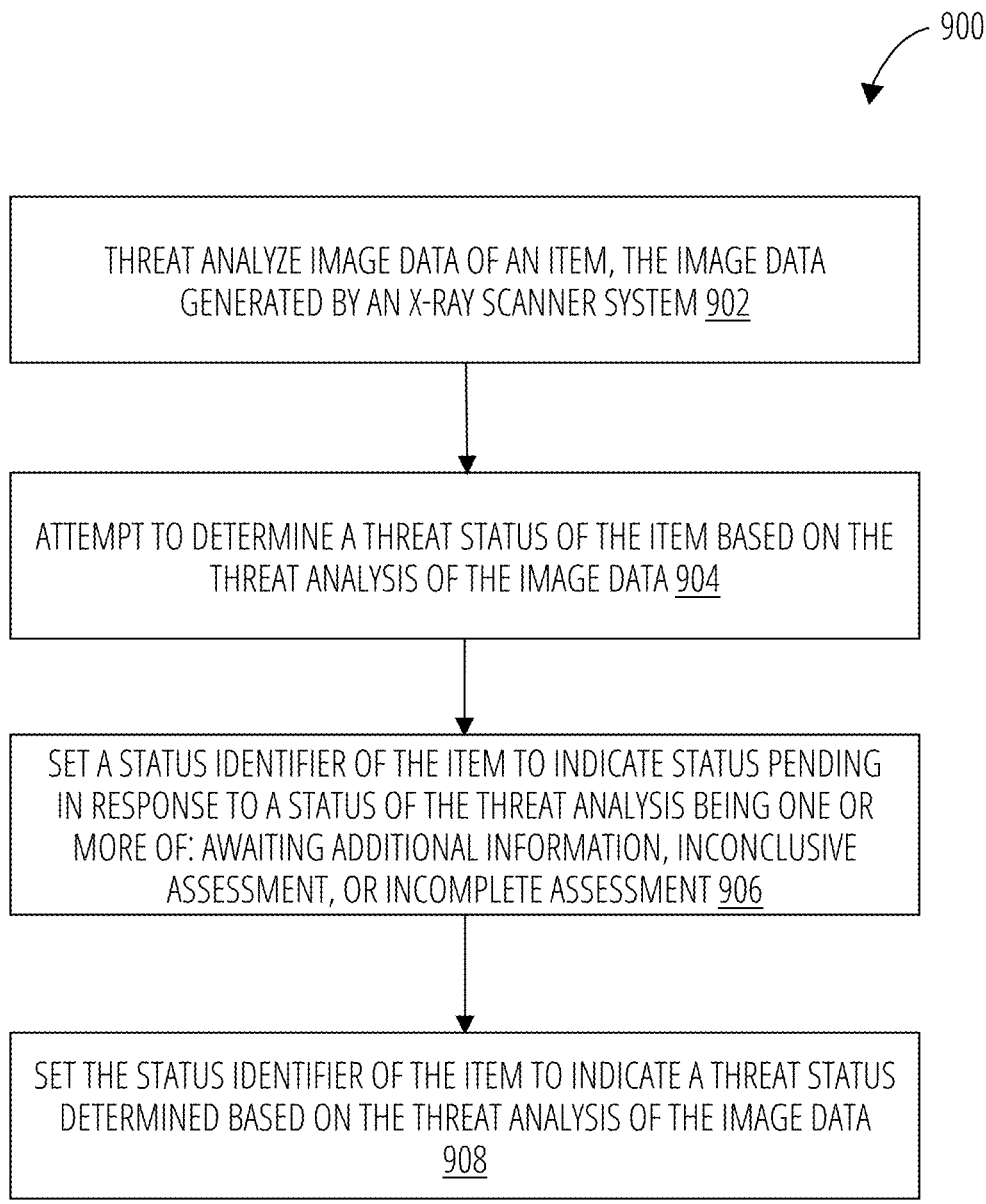
FIG. 9, FIG. 10, FIG. 11, FIG. 12, and FIG. 13 are flow diagrams depicting example processes related to operation of a side buffer that does not include a high threat holding area for security lane.

FIG. 9 is a flow diagram depicting a process 900 to set a status identifier for identifying a threat status of an item in a security lane of a security checkpoint, in accordance with one or more embodiments.

Although the example process 900 depicts a particular sequence of operations, the sequence may be altered without departing from the scope of the present disclosure. For example, some of the operations depicted may be performed in parallel or in a different sequence that does not materially affect the function of the process 900. In other examples, different components of an example device or system that implements the process 900 may perform functions at substantially the same time or in a specific sequence.

According to one or more embodiments, process 900 may include threat analyzing image data of an item, the image data generated by an X-ray scanner system at block 902. The x-ray scanner system and threat analyzing algorithms may be part of a security lane of a security checkpoint. Threat analyzing image data of an item may include automated image-based threat analysis process that uses algorithms to scrutinize the content of the image data for any indicators of threats. During this analysis, various factors such as object segmentation, object recognition, anomaly detection, and/or pattern matching may be used. In one or more embodiments, image data utilized for threat analysis are taken at the same plane, or different planes with ramps. In some examples the image data is piecewise generally planner (linear or crowned) region.

According to one or more embodiments, process 900 may include attempting to determine a threat status of the item based on the threat analysis of the image data at block 904.

According to one or more embodiments, process 900 may include setting a status identifier of the item to indicate "status pending" in response to the threat analysis being: awaiting additional information, inconclusive assessment, or incomplete assessment at block 906. When the status identifier is "status pending," that indicates that a threat status of the item is still being determined.

According to one or more embodiments, process 900 may include setting the status identifier of the item to indicate a threat status determined based on the threat analysis of the image data of the item in block 908. Setting the status identifier of the item may include setting the status identifier to indicate "non-threat" in response to a determination by the threat analysis, or setting the status identifier to indicate "threat" in response to a determination by the threat analysis.

In one or more embodiments, the status identifier of the item may be initially set in block 908 of process 900 or may be set in block 908 after being initially set to indicate pending status in block 906.

Different values may be utilized to respectively indicate threat status and/or status of a threat analysis. In one or more embodiments, the status identifier of the item may be set to a first value to indicate a threat and to a second value to indicate a non-threat, where the second value is different than the first value.

A gradient of values may be utilized to respectively indicate a degree of threat. In one or more embodiments, the status identifier may be set to any one of a gradient of values based on the threat analysis where higher values indicate higher threats (e.g., more dangerous threats, without limitation) or probability of the presence of a threat, and lower values indicate lower threats (e.g., less dangerous threats, without limitation) or probability of the presence of a threat.

As a non-limiting example, a value of 0 may indicate pending status, a value of 1 may indicate non-threat status, and values 2 to 10 inclusive may indicate increasing levels of threat status.

Other conventions may be utilized to represent threat status of items without exceeding the scope of this disclosure.

Figure 10:
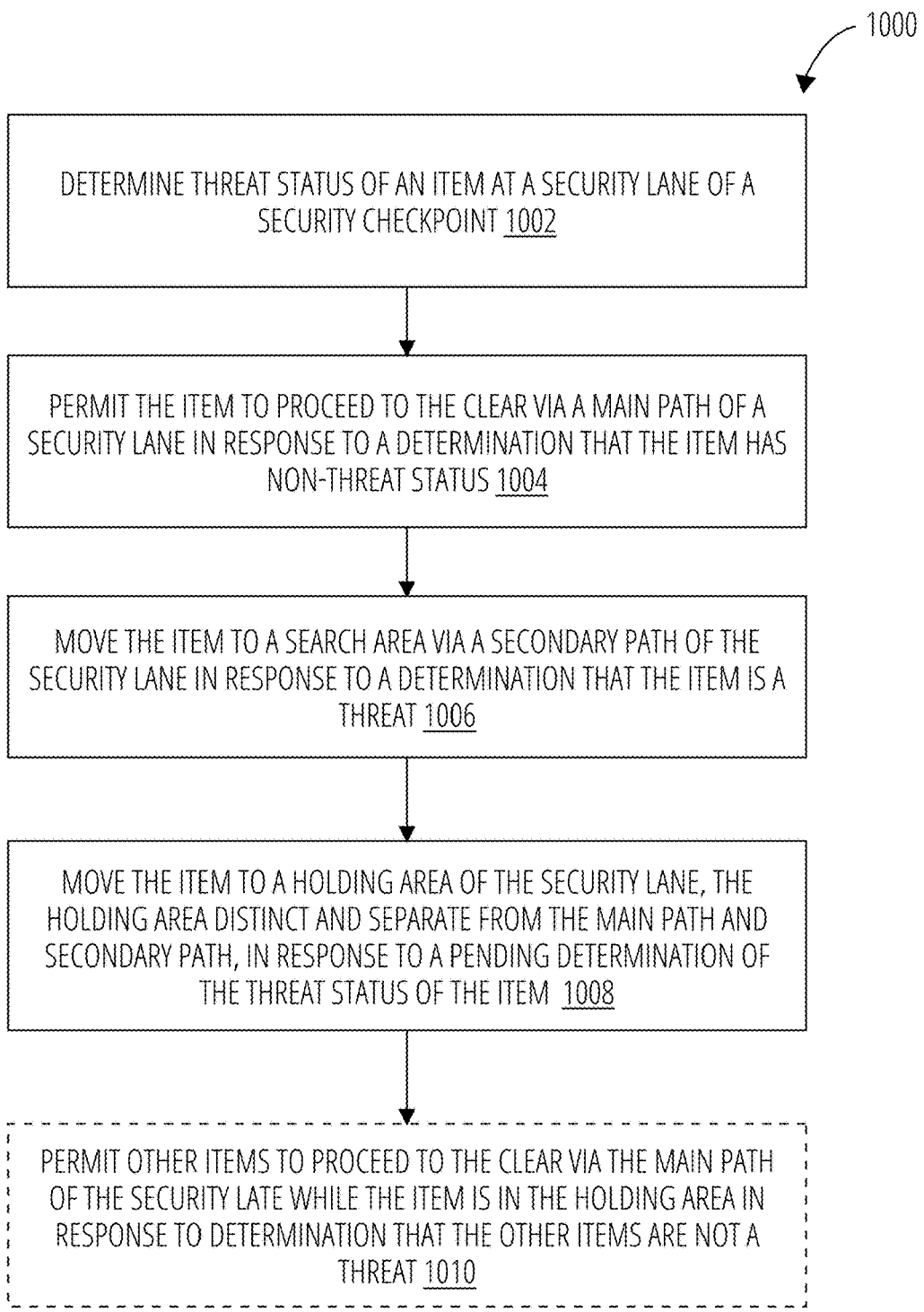

FIG. 10 is a flow diagram depicting a process 1000 to hold an item at a security lane of a security checkpoint while awaiting a threat status for the item, in accordance with one or more embodiments.

Although the example process 1000 depicts a particular sequence of operations, the sequence may be altered without departing from the scope of the present disclosure. For example, some of the operations depicted may be performed in parallel or in a different sequence that does not materially affect the function of the process 1000. In other examples, different components of an example device or system that implements the process 1000 may perform functions at substantially the same time or in a specific sequence.

According to one or more embodiments, process 1000 may include determining a threat status of an item at a security lane of a security checkpoint at block 1002. Non-limiting example of threat status include: a threat (e.g., threatening or potentially threatening, without limitation), non-threat, or pending. A pending threat status may indicate, as non-limiting examples, that a determination by the threat analysis is not complete or still being processed.

According to one or more embodiments, process 1000 may include permitting the item to proceed to a clear area via a primary path of a security lane in response to a determination that the item is a non-threat at block 1004. The conveyor system may move the item to the clear area via the primary path of the security lane. Access to the clear area of a security lane is typically not controlled and so is accessible by passengers, airport personnel, airline personnel, and security personnel.

According to one or more embodiments, process 1000 may include moving the item to a search area via a secondary path of the security lane in response to a determination that the item is threat at block 1006. The conveyor system may move the item to the search area via the primary path of the security lane. Access to the search area of a security lane is typically controlled and may be limited solely to security personnel.

According to one or more embodiments, process 1000 may include moving the item to a holding area of the security lane in response to a pending determination of threat status of the item at block 1008. In one or more embodiments, the holding area of the security lane is distinct and separate from the primary path and optionally the secondary path of the security lane, for example, physically located outside the primary path and the secondary path. In one or more embodiments, the holding area may be implemented by a side buffer or a portion of a side buffer (e.g., by one or more cells of a side buffer, without limitation).

According to one or more embodiments, process 1000 may include optionally permitting other items to proceed to the clear area via the primary path of the security lane while the item is in the holding area at block 1010. The other items may be permitted to proceed to the clear area in response to a determination that these other items are non-threats. Since the holding area is separate and distinct from the primary path, the held item does not block or slow the other items while its threat status is being determined.

Figure 11:
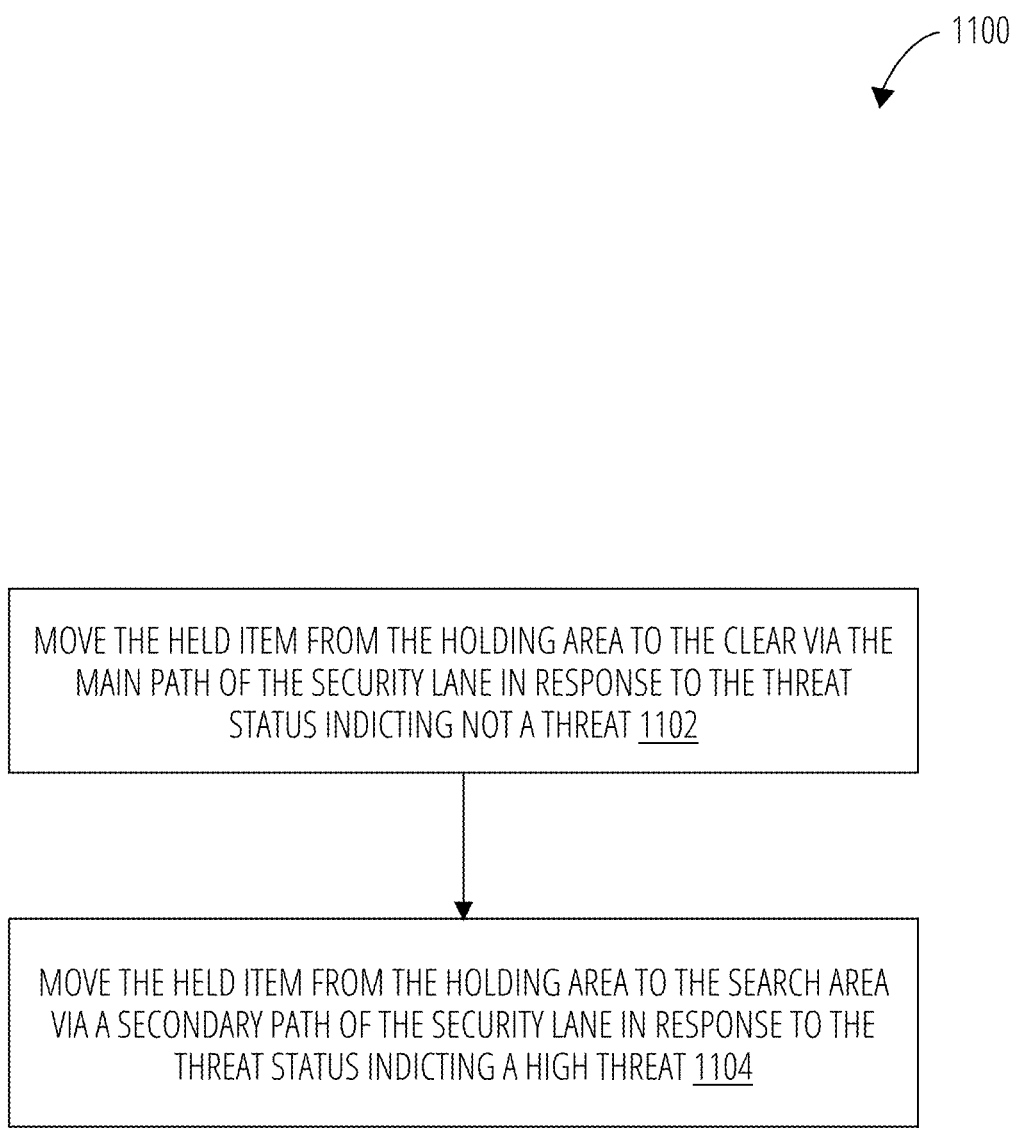

FIG. 11 illustrates an example process 1100 to move items out of a holding area of a security lane, in accordance with one or more embodiments. Although the example process 1100 depicts a particular sequence of operations, the sequence may be altered without departing from the scope of the present disclosure. For example, some of the operations depicted may be performed in parallel or in a different sequence that does not materially affect the function of the process 1100. In other examples, different components of an example device or system that implements the process 1100 may perform functions at substantially the same time or in a specific sequence.

According to one or more embodiments, process 1100 may include moving the held item from the holding area to the clear via the primary path of the security lane in response to the threat status indicating non-threat at block 1102.

According to one or more embodiments, process 1100 may include moving the held item from the holding area to the search area via a secondary path of the security lane in response to the threat status indicating threat at block 1104.

Figure 12:
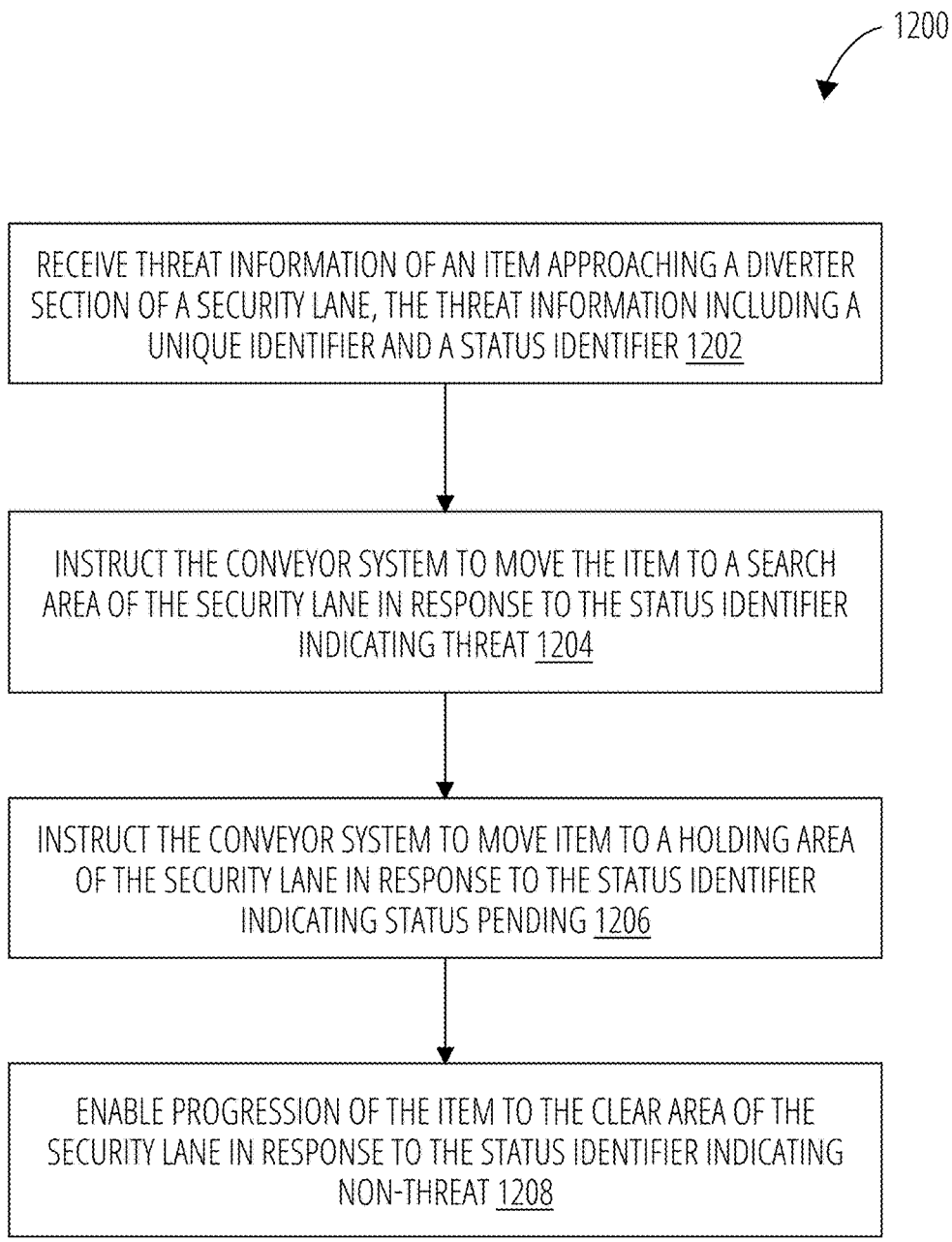

FIG. 12 is a flow diagram depicting a process 1200 to control movement of an item into a holding area of a security lane, in accordance with one or more embodiments. In one or more embodiments, some or a totality of operations of process 1200 may be performed by a control system or management system of a security lane that includes one or more side buffers.

Although the example process 1200 depicts a particular sequence of operations, the sequence may be altered without departing from the scope of the present disclosure. For example, some of the operations depicted may be performed in parallel or in a different sequence that does not materially affect the function of the process 1200. In other examples, different components of an example device or system that implements the process 1200 may perform functions at substantially the same time or in a specific sequence.

According to one or more embodiments, process 1200 may include receiving threat information of (e.g., about, without limitation) an item in a security lane, at block 1202. The item may be approaching (via a conveyor system) a diverter section of a security lane. The diverter may be at an input of a side buffer. The threat information may include a unique identifier associated with the item and a status identifier associated with the unique identifier and therefore associated with the item. The status identifier may indicate the threat status of the item (e.g., "threat" or "non-threat," without limitation).

According to one or more embodiments, process 1200 may include instructing the conveyor system to move the item to a search area via a secondary path of the security lane in response to the status identifier indicating the status as "threat," at block 1204.

According to one or more embodiments, process 1200 may include instructing the conveyor system to move item to a holding area of the security lane in response to the status identifier indicating status pending at block 1206.

According to one or more embodiments, process 1200 may include enabling progression of the item to the clear area via a primary path of the security lane in response to the status identifier indicating a non-threat at block 1208.

Figure 13:
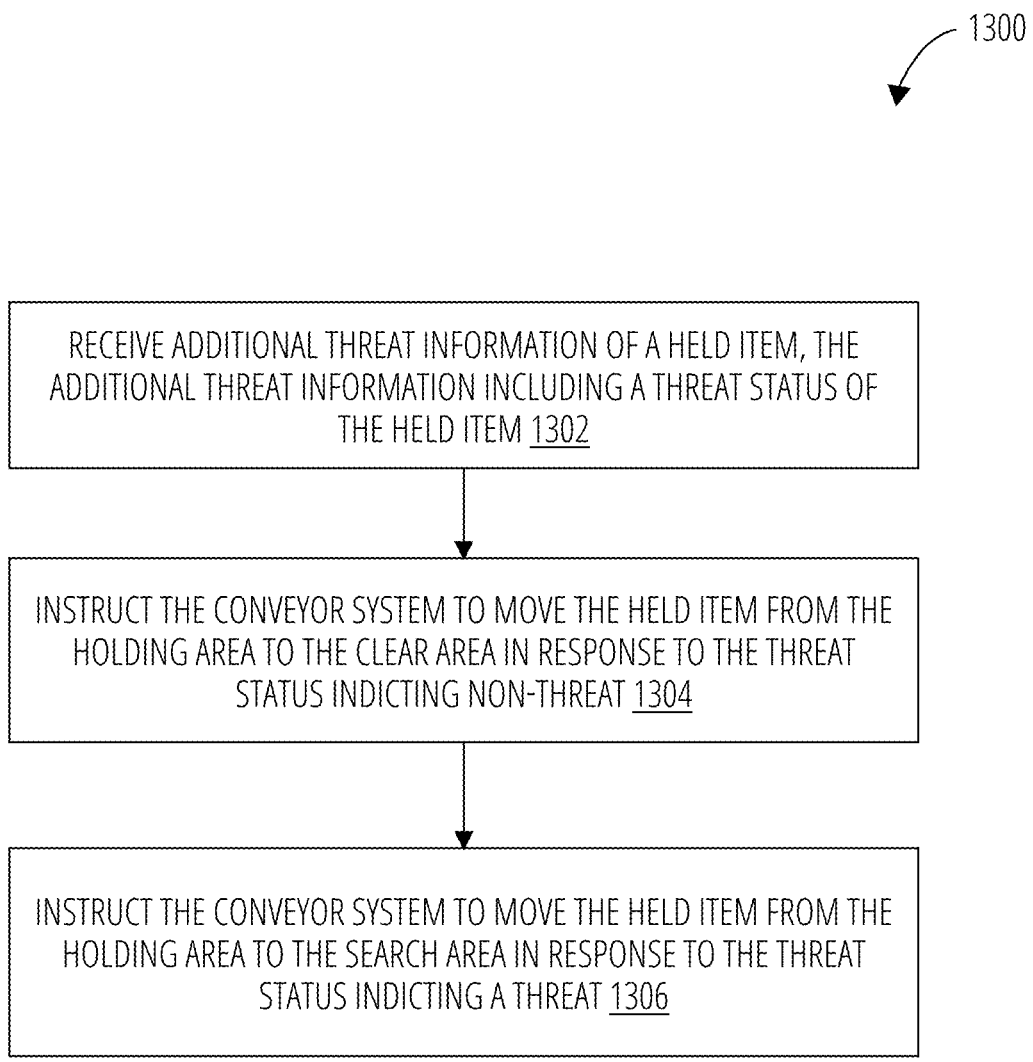

FIG. 13 is a flow diagram depicting a process 1300 for controlling movement of an item from a holding area of a security lane, in accordance with one or more embodiments.

Although the example process 1300 depicts a particular sequence of operations, the sequence may be altered without departing from the scope of the present disclosure. For example, some of the operations depicted may be performed in parallel or in a different sequence that does not materially affect the function of the process 1300. In other examples, different components of an example device or system that implements the process 1300 may perform functions at substantially the same time or in a specific sequence.

According to one or more embodiments, process 1300 may include receiving additional threat information of a held item, the additional threat information including a threat status of the held item at block 1302.

According to one or more embodiments, process 1300 may include instructing the conveyor system to move the held item from the holding area to the clear via the primary path of the security lane in response to the threat status indicating non-threat at block 1304.

According to one or more embodiments, process 1300 may include instructing the conveyor system to move the held item from the holding area to the search area via a secondary path of the security lane in response to the threat status indicating a threat at block 1306.

FIG. 14 to FIG. 17 are flow diagrams depicting example processes related to operation of a side buffer that does not include a high threat holding area for security lane.

Figure 14:
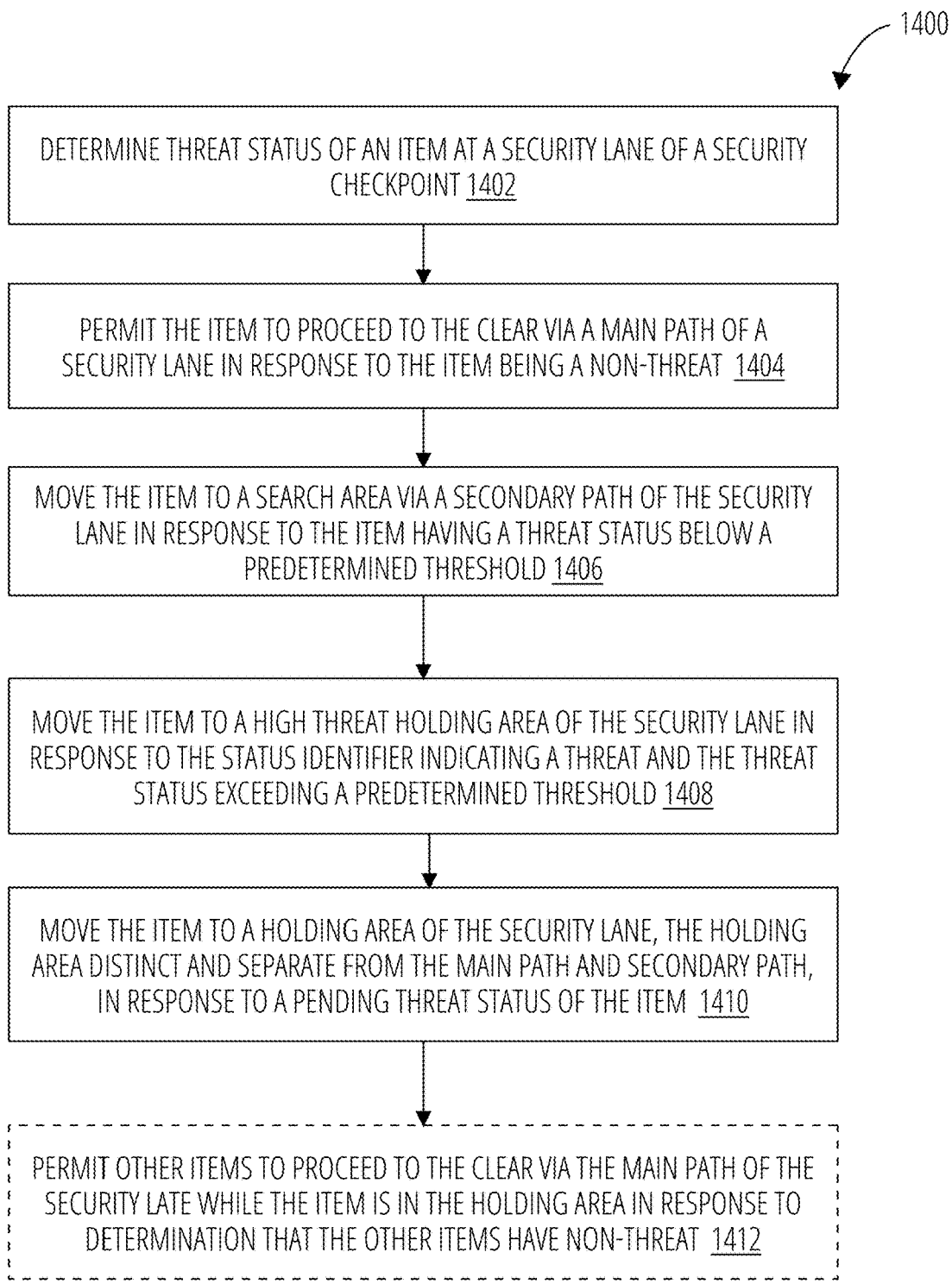
FIG. 14, FIG. 15, FIG. 16, and FIG. 17 are flow diagrams depicting example processes related to operation of a side buffer that does not include a high threat holding area for security lane.

FIG. 14 is a flow diagram depicting a process 1400 for moving an item through a security lane of a security checkpoint, in accordance with one or more embodiments.

Although the example process 1400 depicts a particular sequence of operations, the sequence may be altered without departing from the scope of the present disclosure. For example, some of the operations depicted may be performed in parallel or in a different sequence that does not materially affect the function of the process 1400. In other examples, different components of an example device or system that implements the process 1400 may perform functions at substantially the same time or in a specific sequence.

According to one or more embodiments, process 1400 may include determining a threat status of an item at a security lane of a security checkpoint at block 1402. Example threat status may be threatening (e.g., threatening or potentially threatening, without limitation), non-threatening or pending, A pending threat status may indicate, as non-limiting examples, that the threat analysis is incomplete, additional information is needed to complete the threat analysis, or a threat analysis was inconclusive.

According to one or more embodiments, process 1400 may include permitting the item to proceed to a clear area via a primary path of a security lane in response to the item being a non-threat at block 1404. Access to the clear area of a security lane is typically not controlled and so is accessible by passengers, airport personnel, airline personnel, and security personnel.

According to one or more embodiments, process 1400 may include moving the item to a search area via a secondary path of the security lane in response to the item being a threat and having a threat status below a predetermined threshold at block 1406. Optionally, access to the search area of a security lane may be controlled and may be limited solely to security personnel.

According to one or more embodiments, process 1400 may include moving the item to a high threat holding area of the security lane in response to the status identifier indicating a threat and the threat status exceeding (e.g., at or above, without limitation) a predetermined threshold at block 1408.

According to one or more embodiments, process 1400 may include moving the item to a holding area of the security lane in response to a pending threat status of the item at block 1410. In one or more embodiments, the holding area of the security lane is distinct and separate from the primary path and optionally the secondary path of the security lane, for example, physically located outside the primary path and the secondary path.

According to one or more embodiments, process 1400 may optionally include permitting other items to proceed to the clear via the primary path of the security lane while the item is in the holding area at block 1412. The other items may be permitted to proceed to the clear area in response to a determination that these other items being a non-threat. Since the holding area is separate and distinct from the primary path, the held item does not block or slow the other items while its threat status is being determined.

Figure 15:
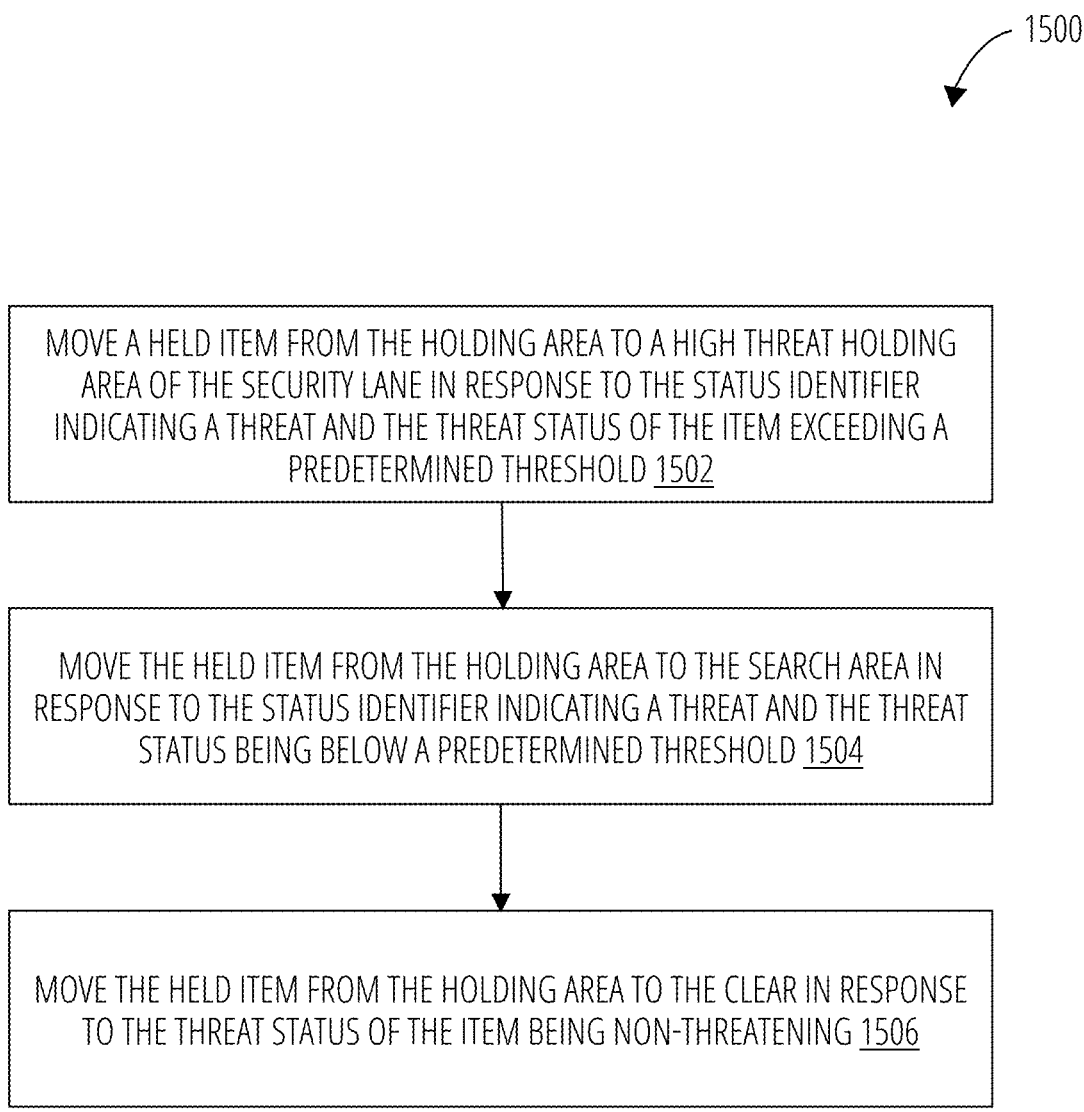

FIG. 15 illustrates an example routine for moving items out of a holding area of a security lane, in accordance with one or more embodiments. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to one or more embodiments, process 1500 may include moving a held item from the holding area to a high threat holding area of the security lane in response to the status identifier indicating a threat and the threat status of the item exceeding (e.g., at or above, without limitation) a predetermined threshold at block 1502.

According to one or more examples, process 1500 may include moving the held item from the holding area to the search area in response to the status identifier indicating a threat and the threat status of the item being below a predetermined threshold at block 1504.

According to one or more examples, process 1500 may include moving the held item from the holding area to the clear in response to the threat status of the item being non-threatening at block 1506. The system comprises a process 1500.

Figure 16:
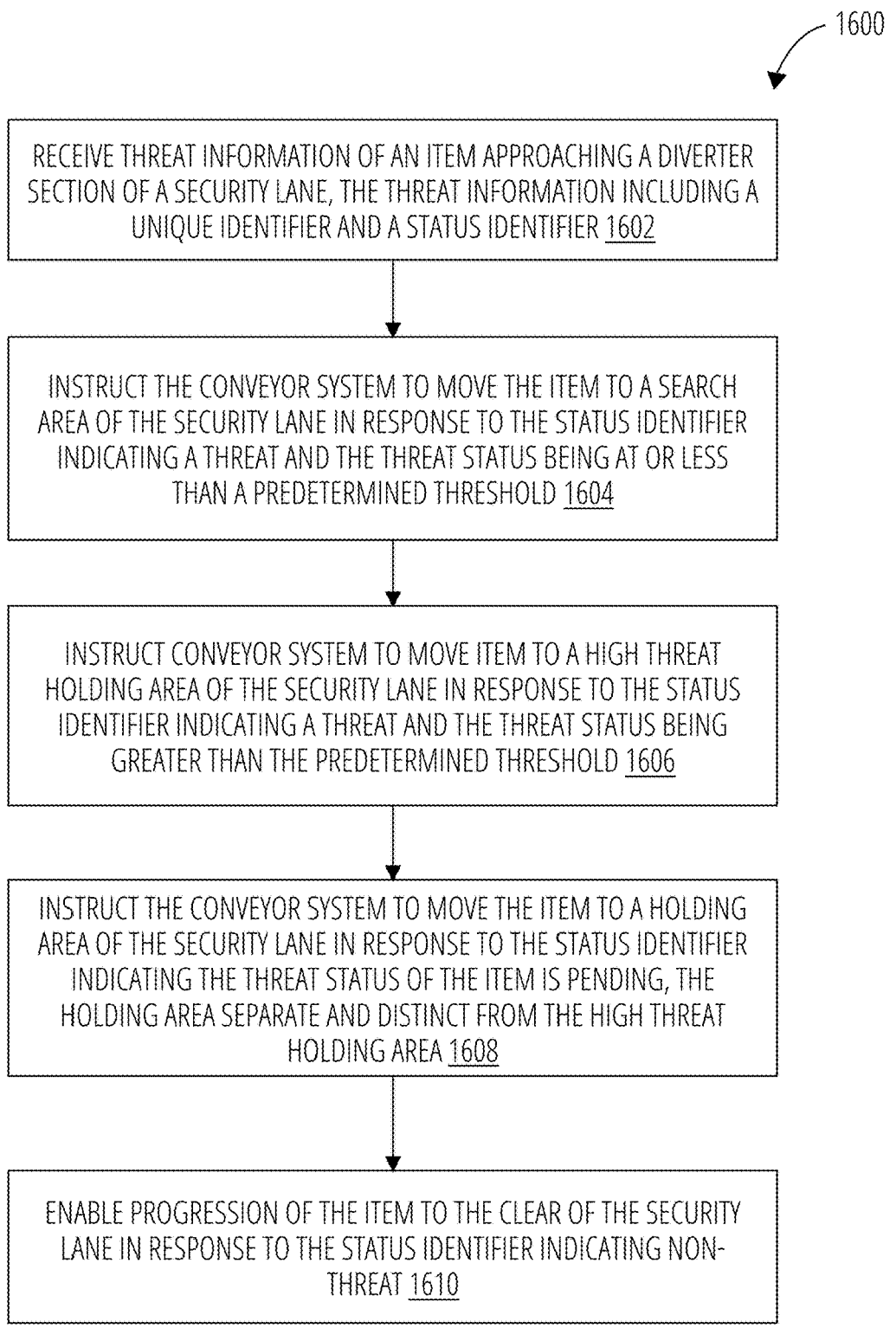

FIG. 16 illustrates an example process 1600 for controlling movement of an item into a holding area of a security lane, in accordance with one or more embodiments.

Although the example process 1600 depicts a particular sequence of operations, the sequence may be altered without departing from the scope of the present disclosure. For example, some of the operations depicted may be performed in parallel or in a different sequence that does not materially affect the function of the process 1600. In other examples, different components of an example device or system that implements the process 1600 may perform functions at substantially the same time or in a specific sequence.

According to one or more embodiments, process 1600 may include receiving threat information of item approaching a diverter section of a security lane, the threat information including a unique identifier and a status identifier at block 1602.

According to one or more embodiments, process 1600 may include instructing the conveyor system to move the item to a search area via a secondary path of the security lane in response to the status identifier indicating a threat and the threat status being at or less than a predetermined threshold at block 1604.

According to one or more embodiments, process 1600 may include instructing conveyor system to move item to a high threat holding area of the security lane in response to the status identifier indicating a threat and the threat status being greater than the predetermined threshold at block 1606.

According to one or more embodiments, process 1600 may include instructing the conveyor system to move the item to a holding area of the security lane in response to the status identifier indicating the threat status of the item is pending, the holding area separate and distinct from the high threat holding area at block 1608.

According to one or more embodiments, process 1600 may include enabling progression of the item to the clear via a primary path of the security lane in response to the status identifier indicating non-threat status at block 1610.

Figure 17:
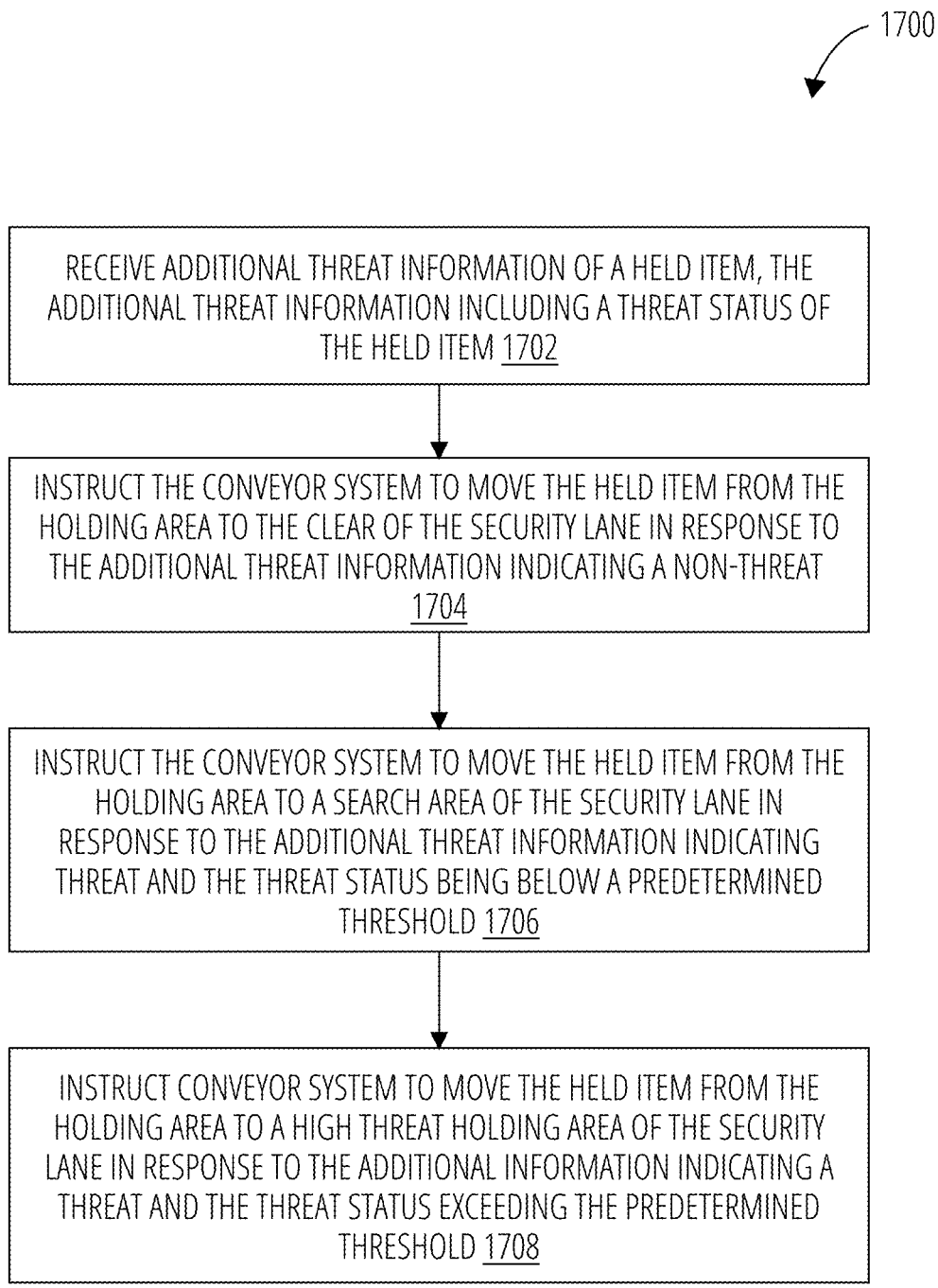

FIG. 17 illustrates an example process 1700 for controlling movement of an item from a holding area of a security lane. Although the example process 1700 depicts a particular sequence of operations, the sequence may be altered without departing from the scope of the present disclosure. For example, some of the operations depicted may be performed in parallel or in a different sequence that does not materially affect the function of the process 1700. In other examples, different components of an example device or system that implements the process 1700 may perform functions at substantially the same time or in a specific sequence.

According to one or more embodiments, process 1700 may include receiving additional threat information of a held item, the additional threat information including a threat status of the held item at block 1702.

According to one or more embodiments, process 1700 may include instructing the conveyor system to move the held item from the holding area to the clear area of the security lane in response to the additional threat information indicating a non-threat at block 1704.

According to one or more embodiments, process 1700 may include instructing the conveyor system to move the held item from the holding area to a search area of the security lane in response to the additional threat information indicating a threat and the threat status being below a predetermined threshold at block 1706.

According to one or more embodiments, process 1700 may include instructing the conveyor system to move the held item from the holding area to a high threat holding area of the security lane in response to the additional threat information indicating a threat and the threat status exceeding (e.g., at or above, without limitation) the predetermined threshold at block 1708.

FIG. 18 to FIG. 27 are schematic diagrams collectively illustrating an example single divest process in accordance with one or more embodiments.

Figure 18:
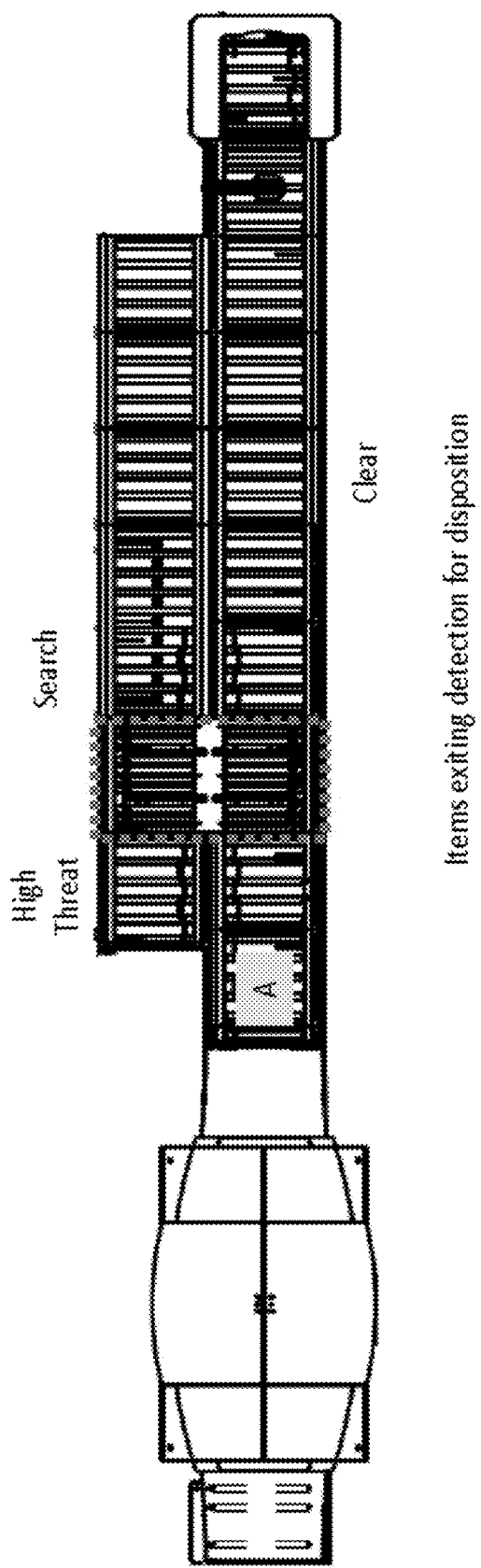
FIG. 18, FIG. 19, FIG. 20, FIG. 21, FIG. 22, FIG. 23, FIG. 24, FIG. 25, FIG. 26, and FIG. 27 are schematic diagrams collectively illustrating an example single divest process in accordance with one or more embodiments.

FIG. 18 depicts an item A exiting detection (threat analysis) for disposition.

Figure 19:
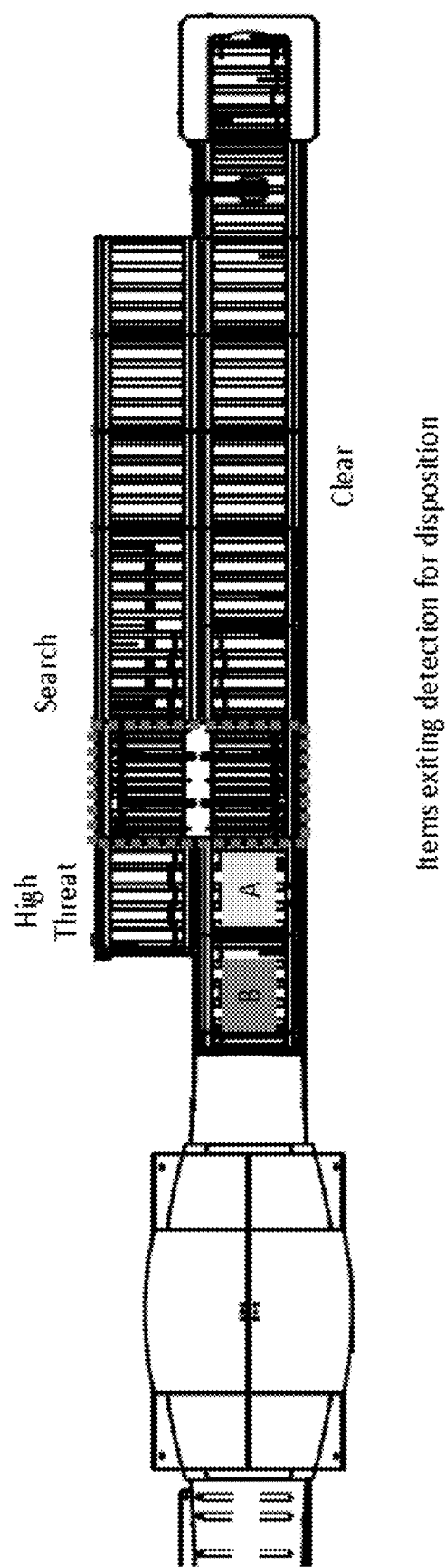

FIG. 19 depicts an item B exiting detection for disposition after item A. Item A advanced to a next section of the conveyor system.

Figure 20:
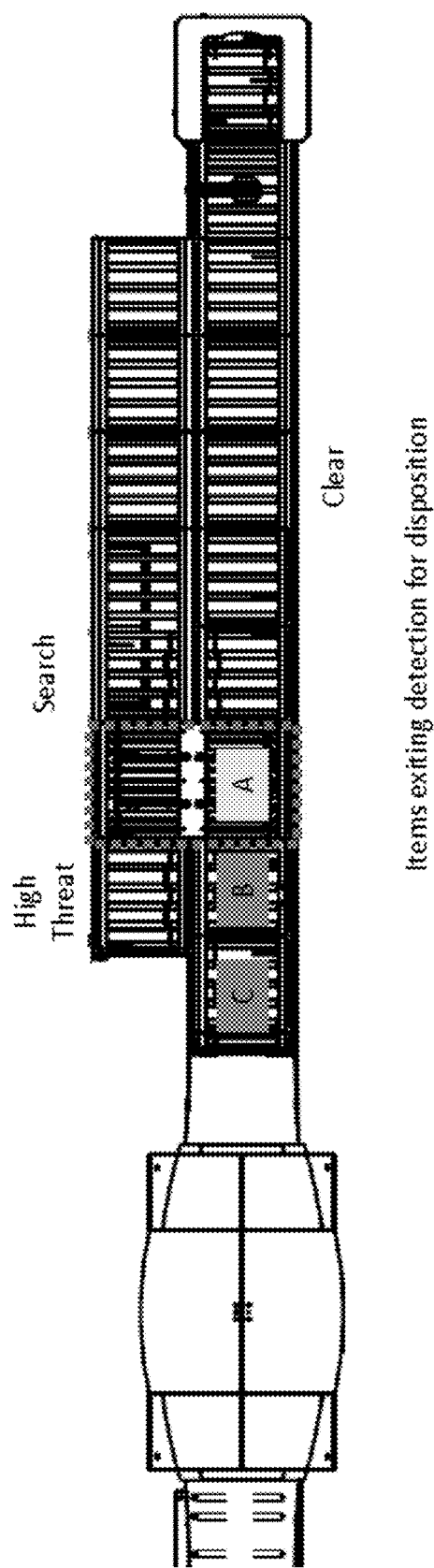

FIG. 20 depicts item C exiting detection for disposition after Item B and item A. Item A advances to a diverter section of the conveyor system. Item B advances to a next section of the conveyor system.

Figure 21:
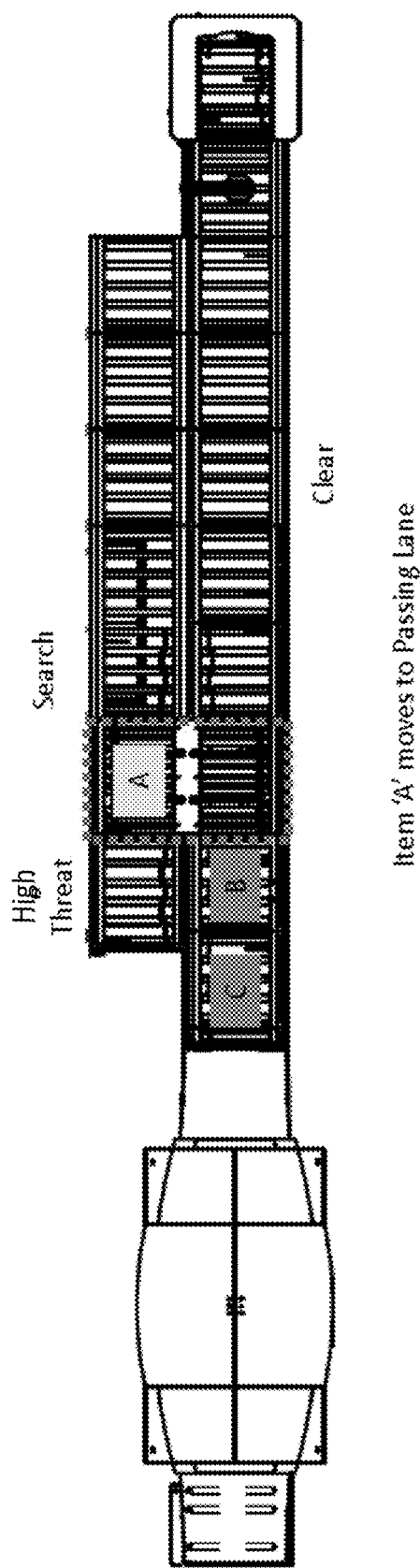
Figure 22:
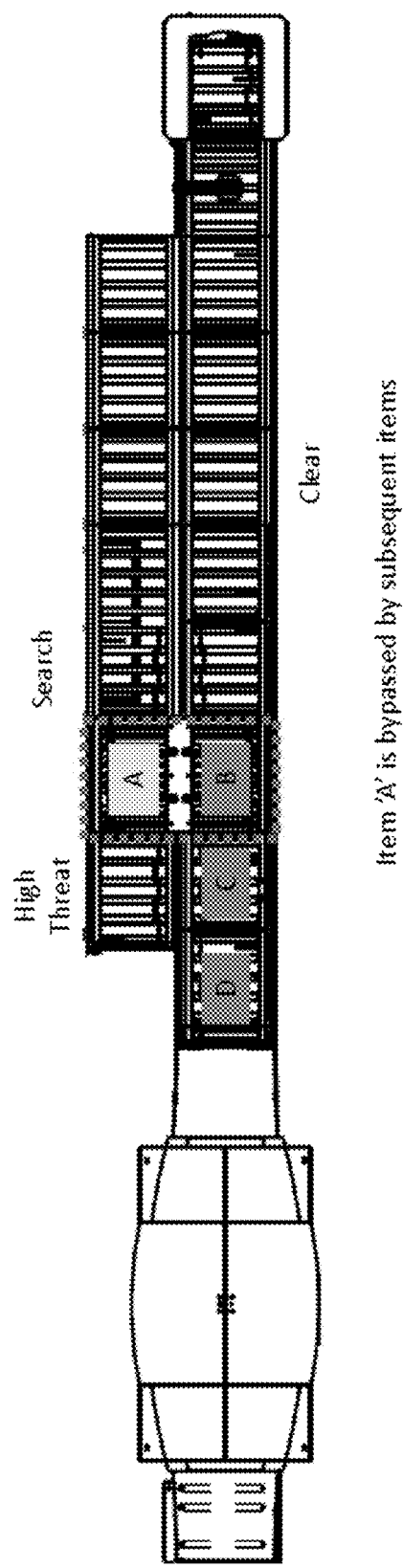
Figure 23:
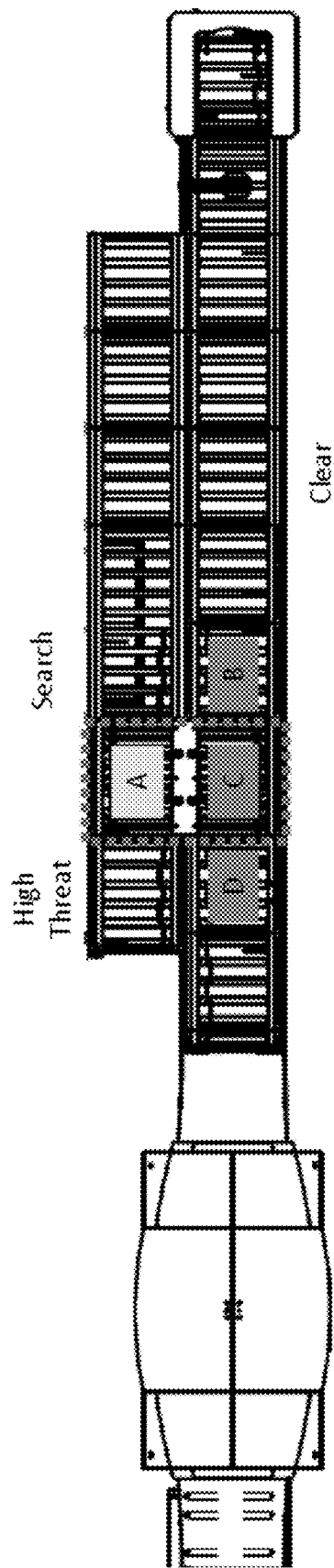
Figure 24:
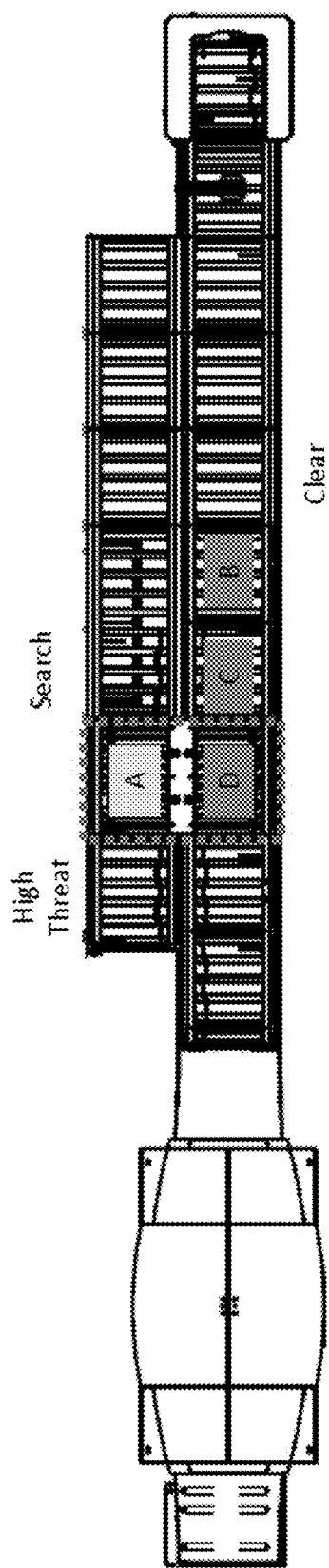
Figure 25:
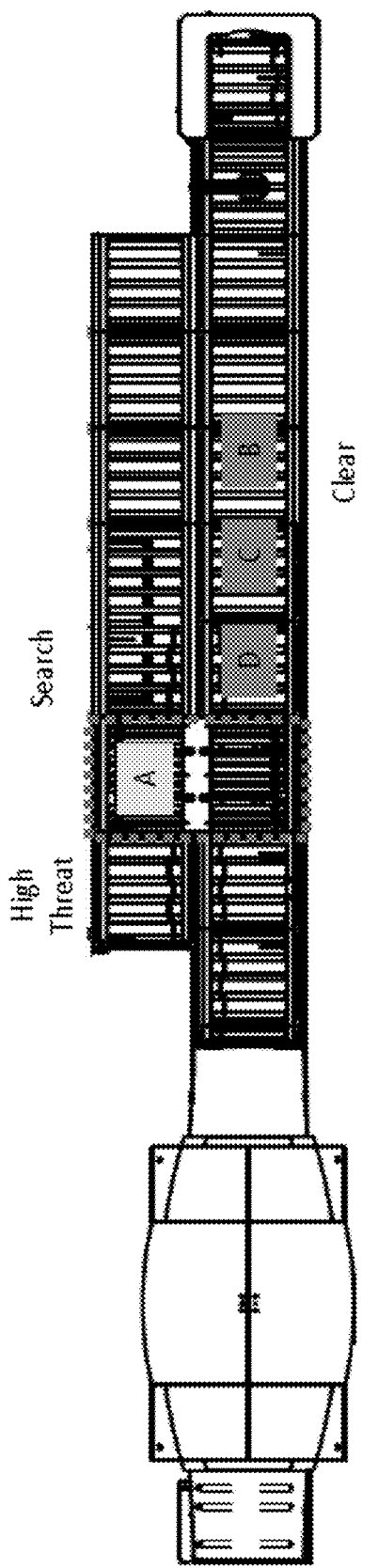

FIG. 21 depicts item A moving to a holding area, for example, to await a determination of threat status.

FIG. 22 to FIG. 25 depict items B, C and D passing item A while item A is in the holding area.

Figure 26:
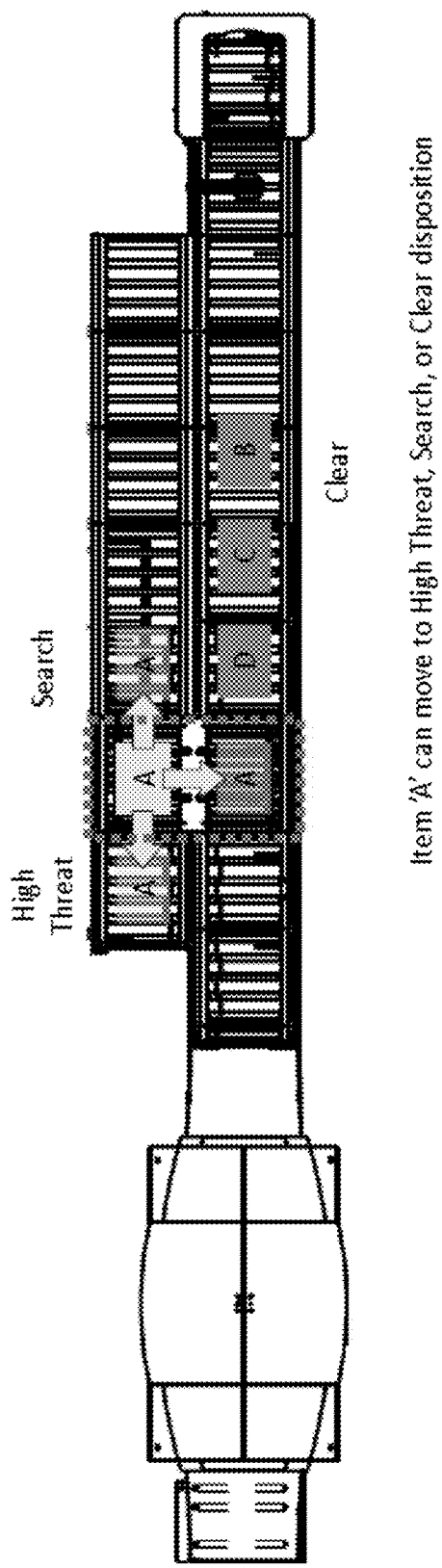

FIG. 26 depicts the three options available to move item A upon determination of its threat status: the high threat area, the secondary path to the search area, or the primary path to the clear area.

Figure 27:
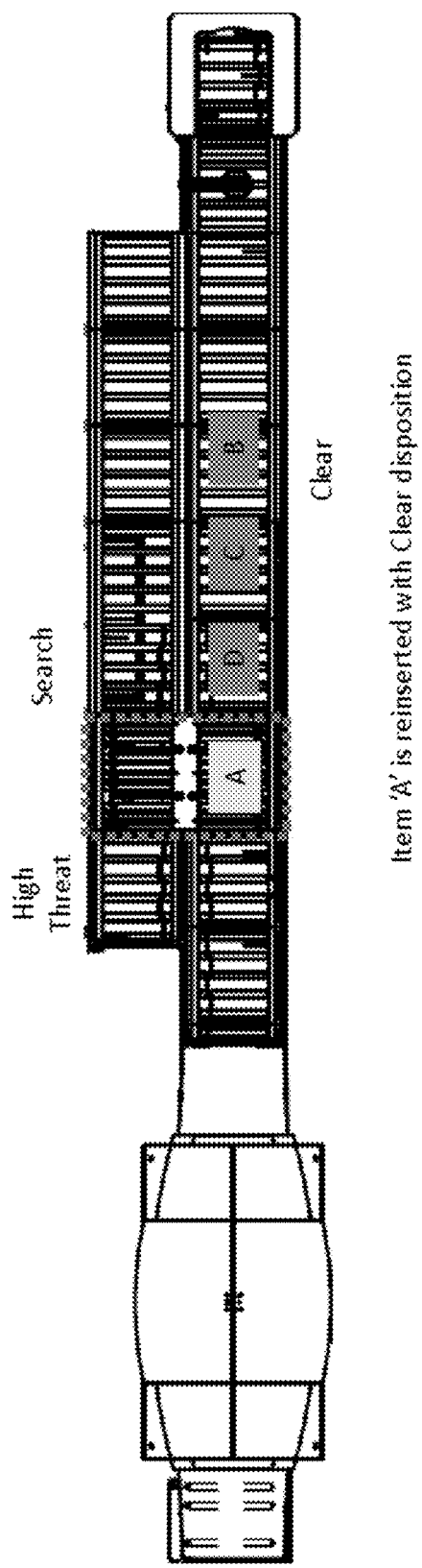

FIG. 27 depicts item A reinserted to the primary path for disposition in the clear area. Notably, item A is now behind items B, C, and D on the primary path. Item A is reinserted in response to the threat status being non-threatening.

FIG. 28 to FIG. 48 are schematic diagrams collectively illustrating an example double divest process in accordance with one or more embodiments.

Figure 28:
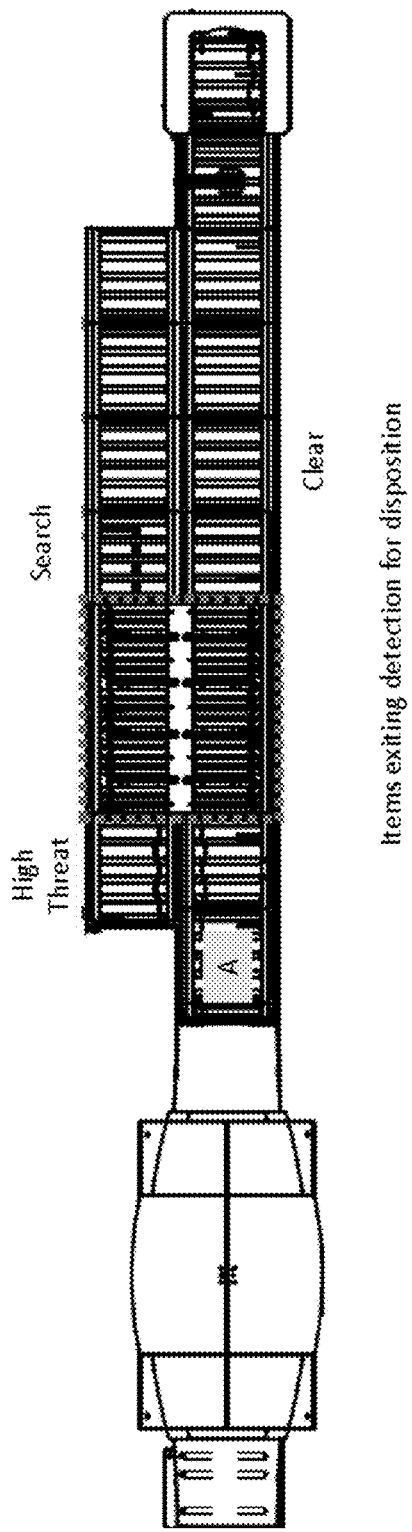
FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, FIG. 45, FIG. 46, FIG. 47, and FIG. 48 are schematic diagrams collectively illustrating an example double divest process in accordance with one or more embodiments.
Figure 29:
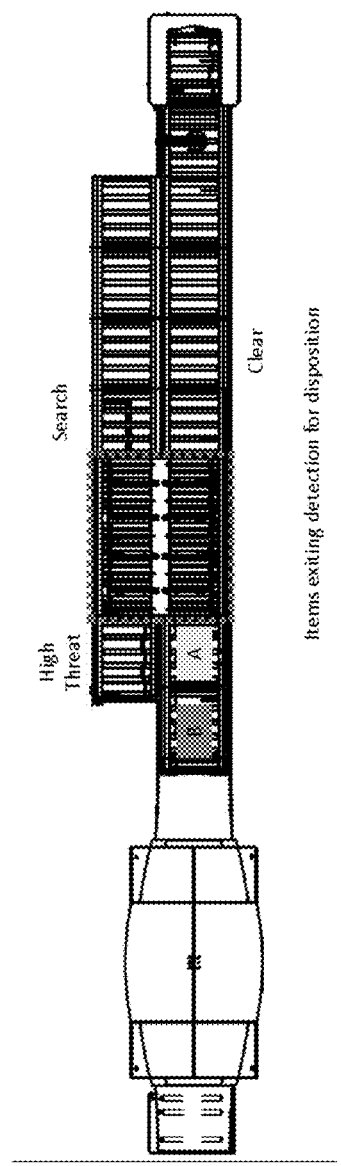
Figure 30:
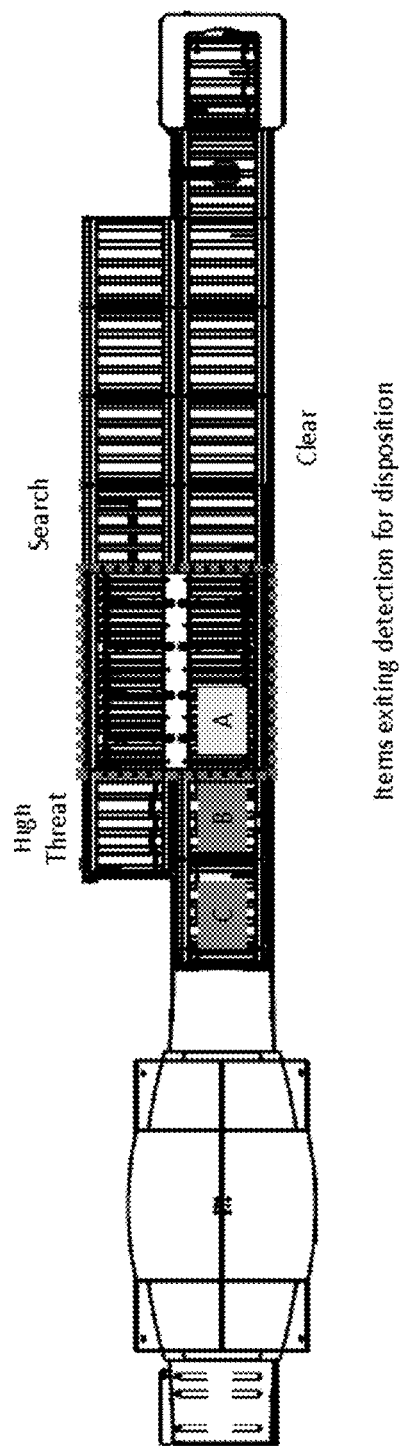

FIG. 28, FIG. 29 and FIG. 30 depict items A, B and C exiting detection (threat analysis) for disposition. As depicted by FIG. 30, item A arrives at the diversion section before items B and C.

Figure 31:
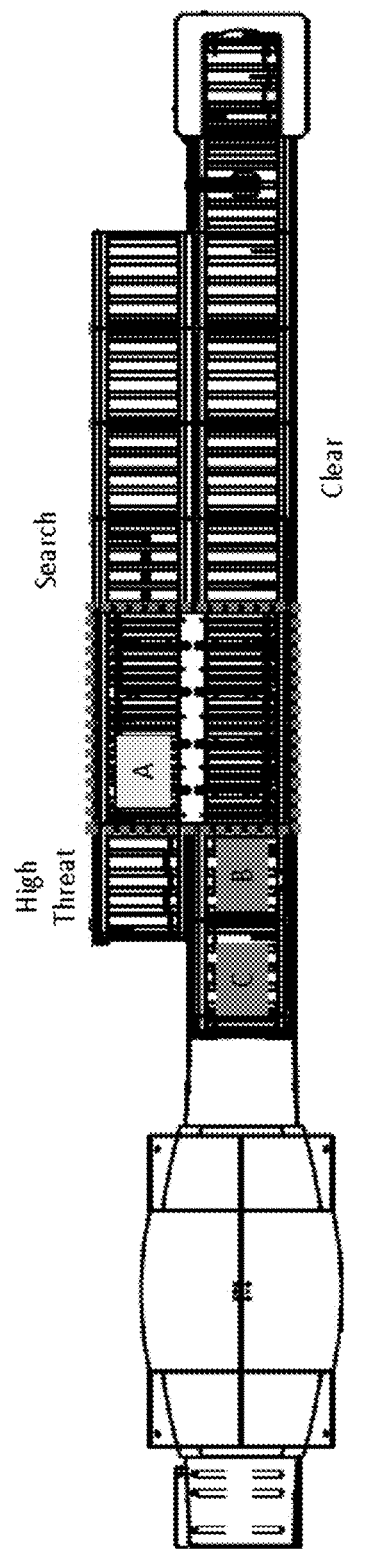
Figure 32:
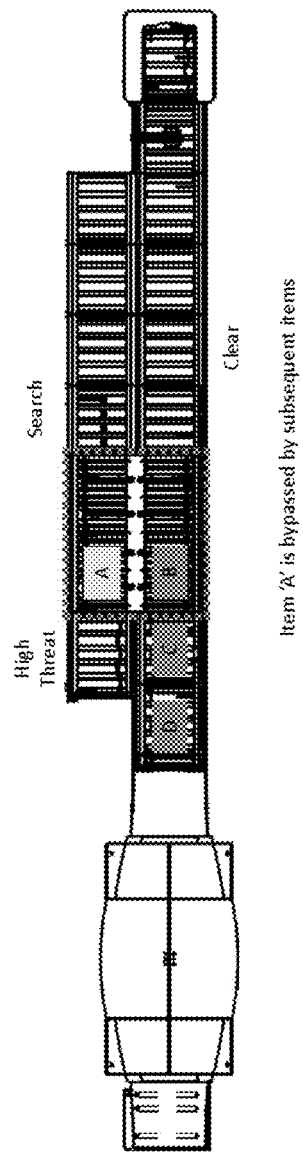
Figure 33:
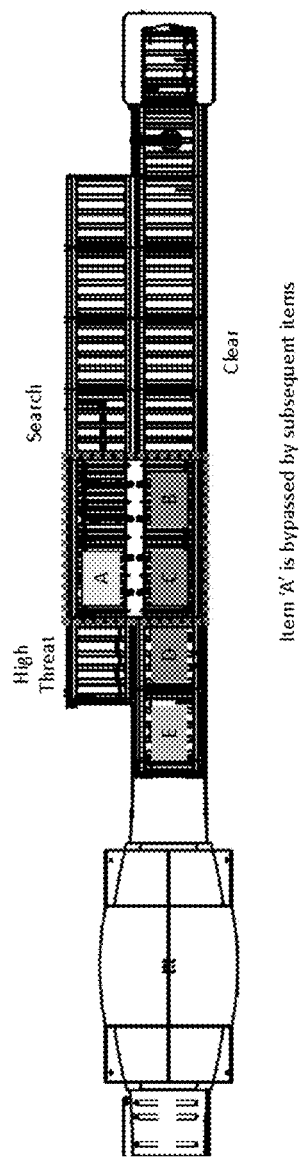
Figure 34:
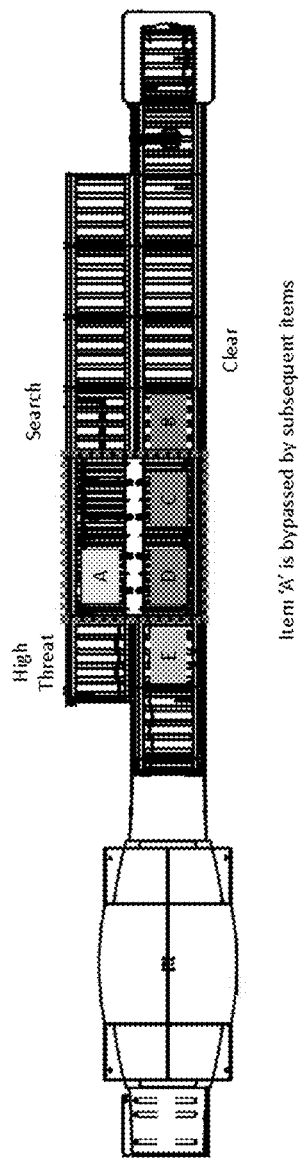
Figure 35:
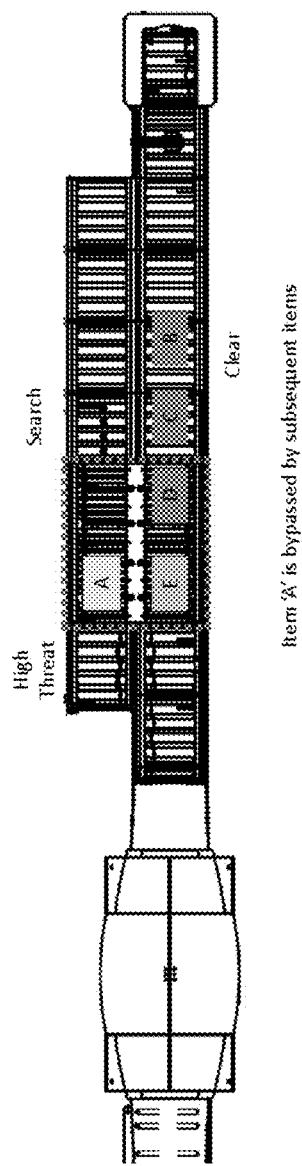

As depicted by FIG. 31, item A is moved to the passing lane (holding area) to await determination of its threat status.

As depicted by FIG. 32 to FIG. 35, items B, C and D pass item A while item A is in the holding area. Item E, which also exited detection, arrives in the diversion section.

Figure 36:
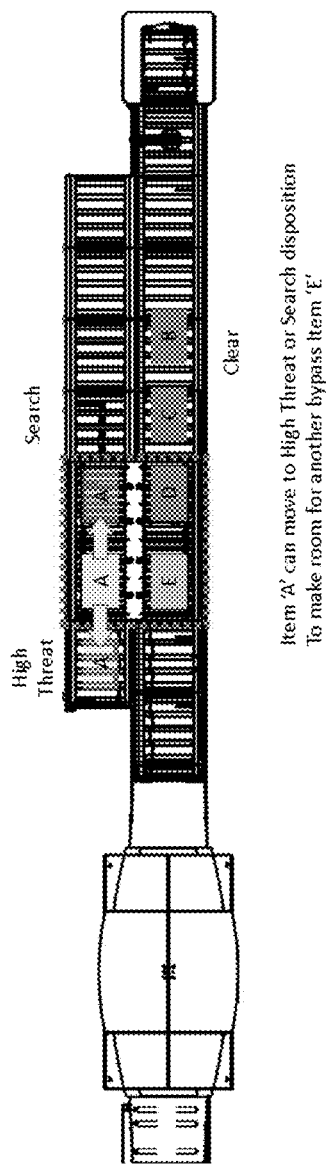

FIG. 36 depicts the options available to move item A, the high threat holding area, the secondary path to the search area, or the primary path to the clear area.

Figure 37:
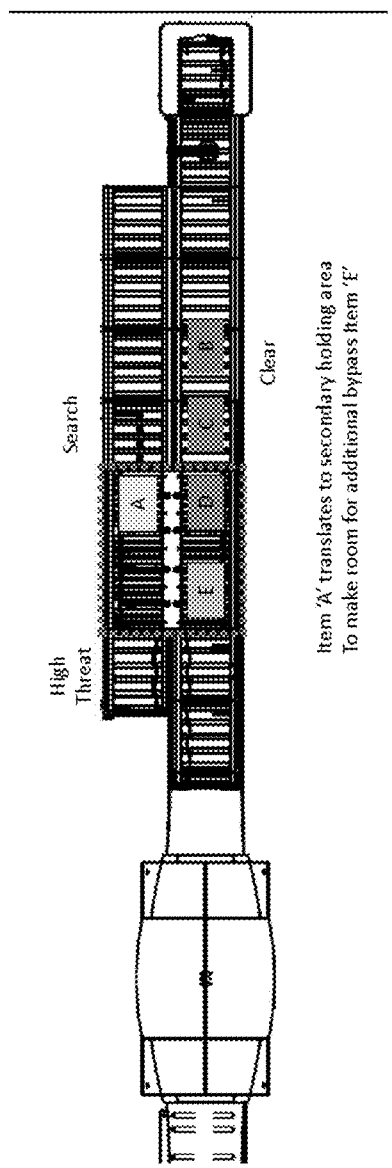
Figure 38:
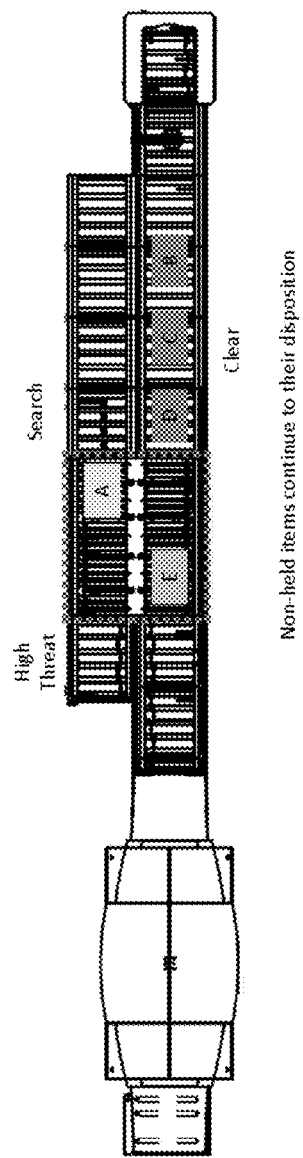

As depicted by FIG. 37 and FIG. 38, item A is moved to a further portion of the holding area and item E is moved to the portion of the holding area where item A previously waited.

Figure 39:
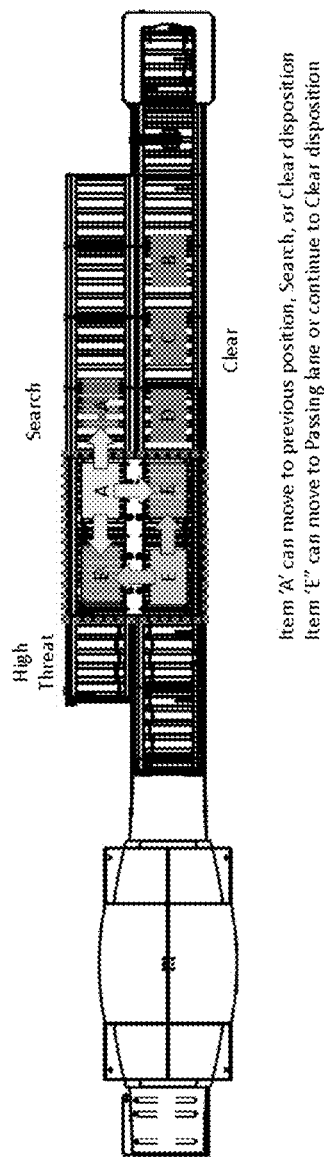

As depicted by FIG. 39, item A can move to a previous position in the holding area, search area, or clear area. Item E can move to the holding area (item A's previous position) or continue to the clear area.

Figure 40:
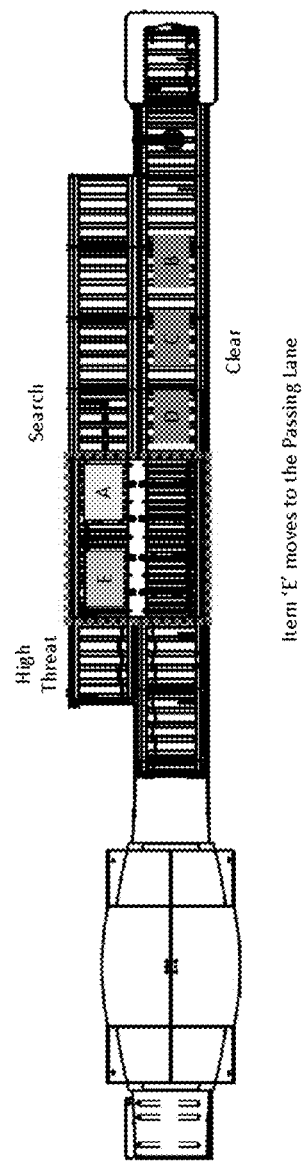

As depicted by FIG. 40, item E is moved to the previous position of A in the holding area to await its threat status determination.

Figure 41:
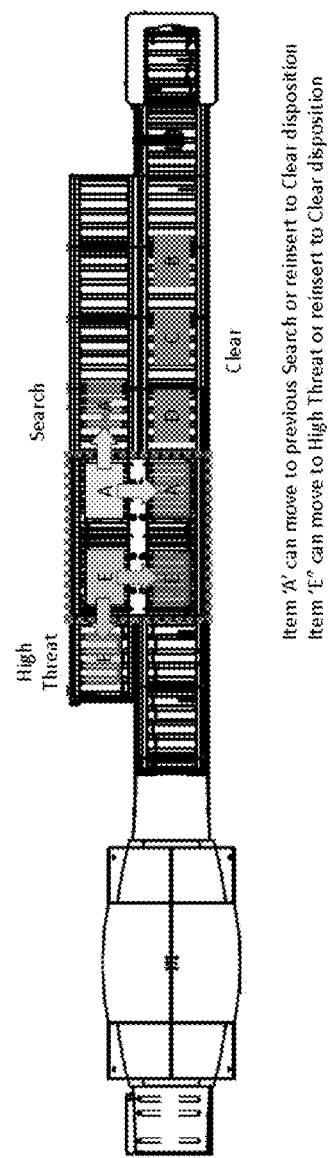

As depicted by FIG. 41, item A can move to the second path to the search area or the primary path to the clear area. Item E can move to the high threat holding area or to the primary path to the clear.

Figure 42:
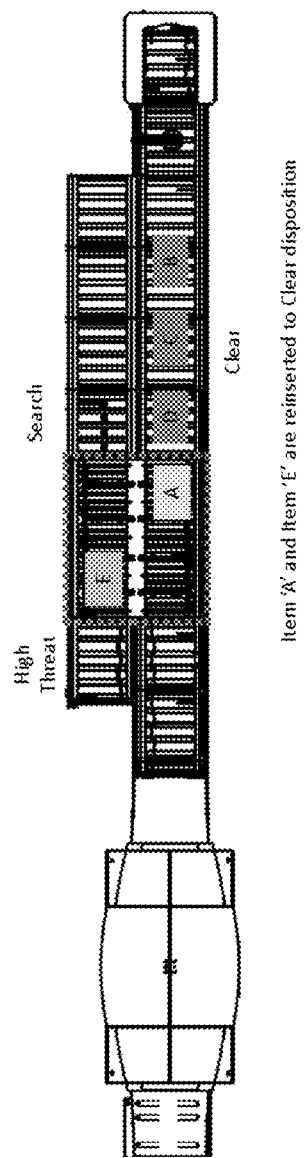

As depicted by FIG. 42, item A is moved to the primary path (because its threat status was determined to be non-threatening) and item E remains in the holding area awaiting determination of its threat status.

Figure 43:
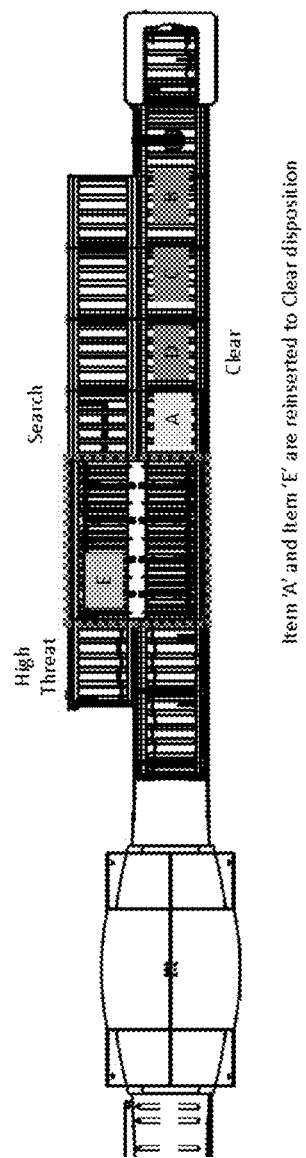

As depicted by FIG. 43, item A is moved to the clear via the primary path while item E remains in the holding area awaiting determination of its threat status.

Figure 44:
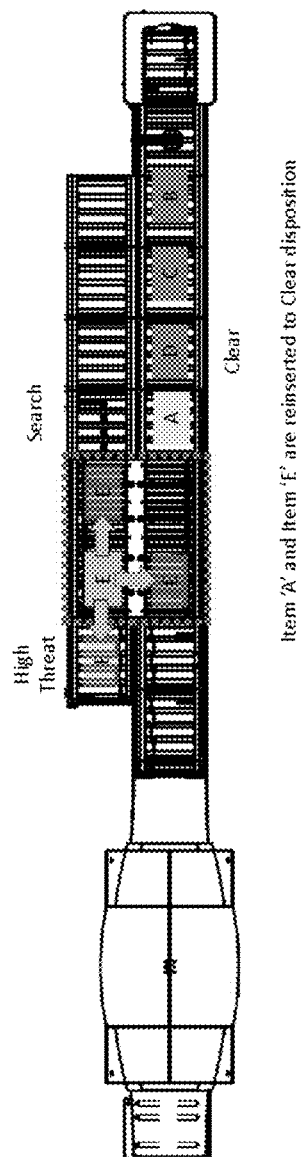

As depicted by FIG. 44, item E can move to the high-threat area, toward the secondary path to the search area, or to the primary path to the clear area.

Figure 45:
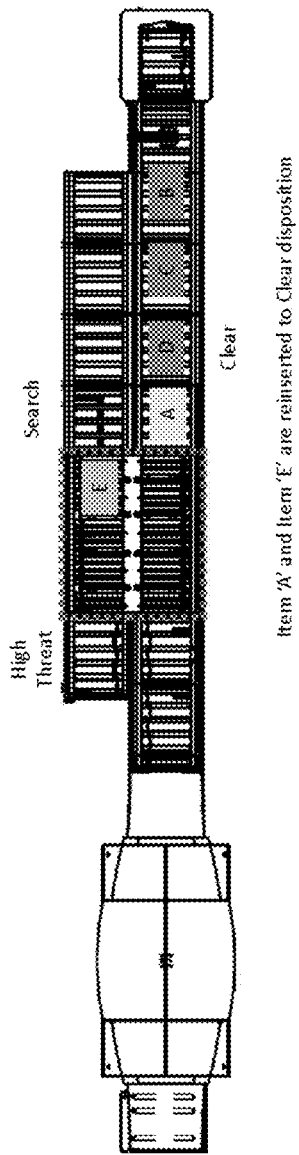

As depicted by FIG. 45, item E is moved toward the secondary path to the search area. As a non-limiting example, item E may be moved toward the secondary path to the search area to free up buffer space closer to the detection, and if item E is cleared it can be transferred closets to the clear area.

Figure 46:
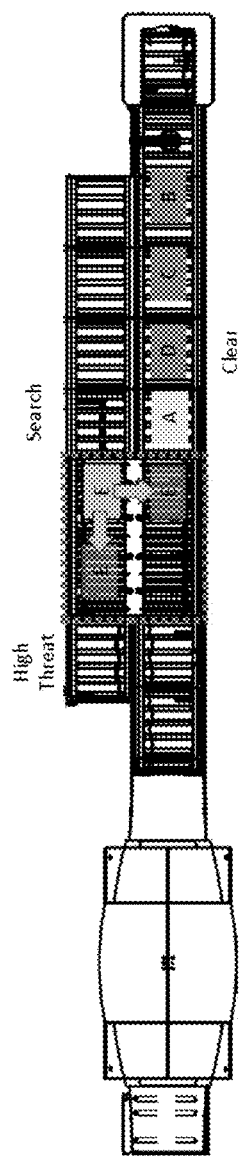

As depicted by FIG. 46, item E can move toward the high-threat area, to the secondary path to the search area, or to the primary path to the clear area.

Figure 47:
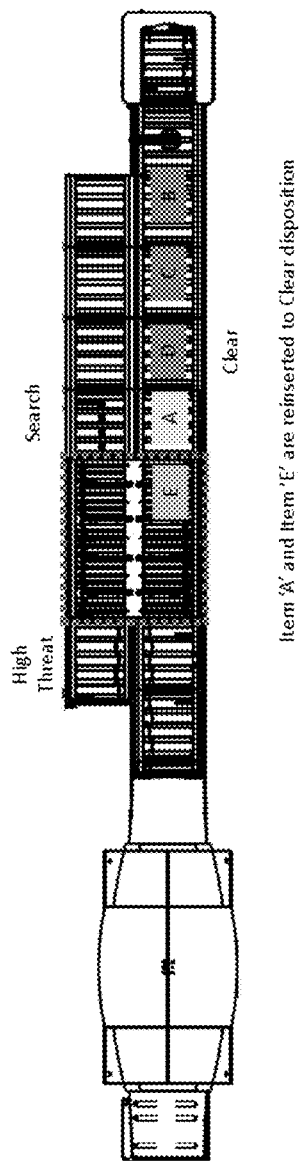

As depicted by FIG. 47, item E moves to the primary path to the clear area because its threat status is non-threatening.

Figure 48:
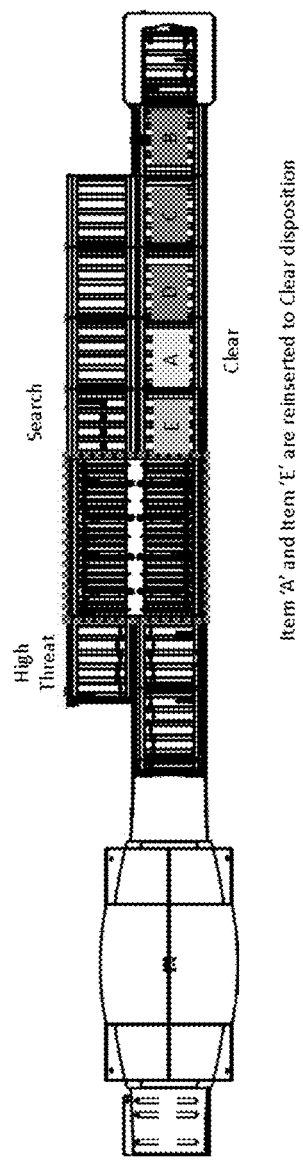

As depicted by FIG. 48, items A, B, C, D, and E move along the primary path to the clear area. Notably, item A is between items D and E.

Figure 49:
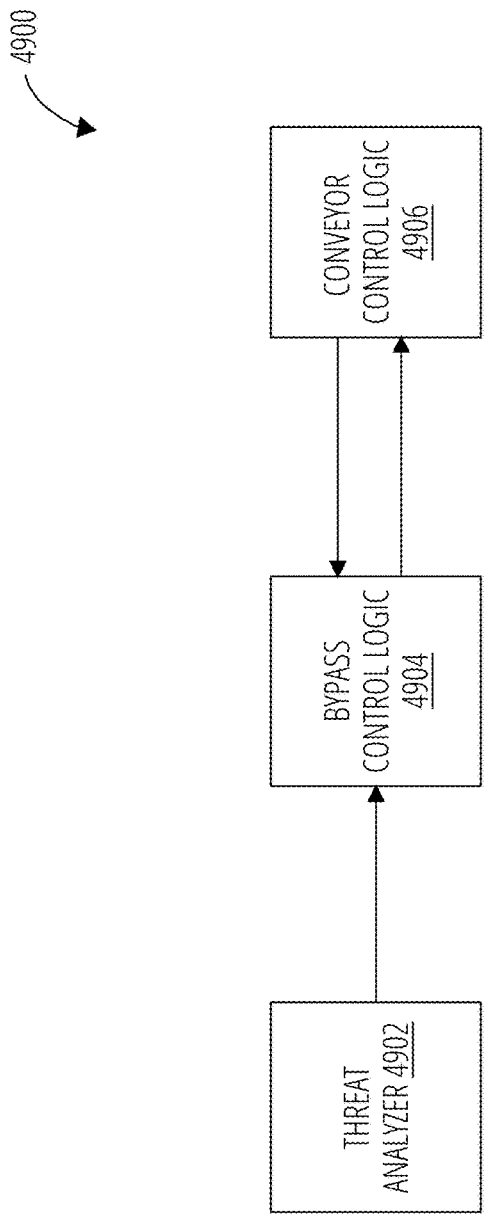
FIG. 49 is a block diagram depicting a system for controlling movement of an item through a security lane, in accordance with one or more embodiments.

FIG. 49 is a block diagram depicting a system 4900 for controlling movement of an item through a security lane, in accordance with one or more embodiments.

System 4900 includes threat analyzer 4902, bypass control logic 4904 and conveyor control logic 4906.

Threat analyzer 4902 performs the initial screening and threat assessment. It provides threat information to bypass control logic 4904 that includes the threat status identifier for an item and the items unique identifier.

Bypass control logic 4904 includes the conditional logic for holding area diversion. Bypass control logic 4904 is configured with specific criteria to determine the diversion of items to the holding area based on one or more of security information from threat analyzer 4902 and feedback information from conveyor control logic 4906 (e.g., location information about items, without limitation).

Conveyor control logic 4906 includes the logic for moving, at a granular level, items through a security lane. In one or more examples, conveyor control logic 4906 receives instructions such as "move item in diversion section to holding area," "move item from holding area to the search area," "move item from holding area to the clear area," or "move item from holding area to high threat holding area," interprets these instructions and controls the mechanisms of the conveyor system to execute the instructed action.

Figure 50:
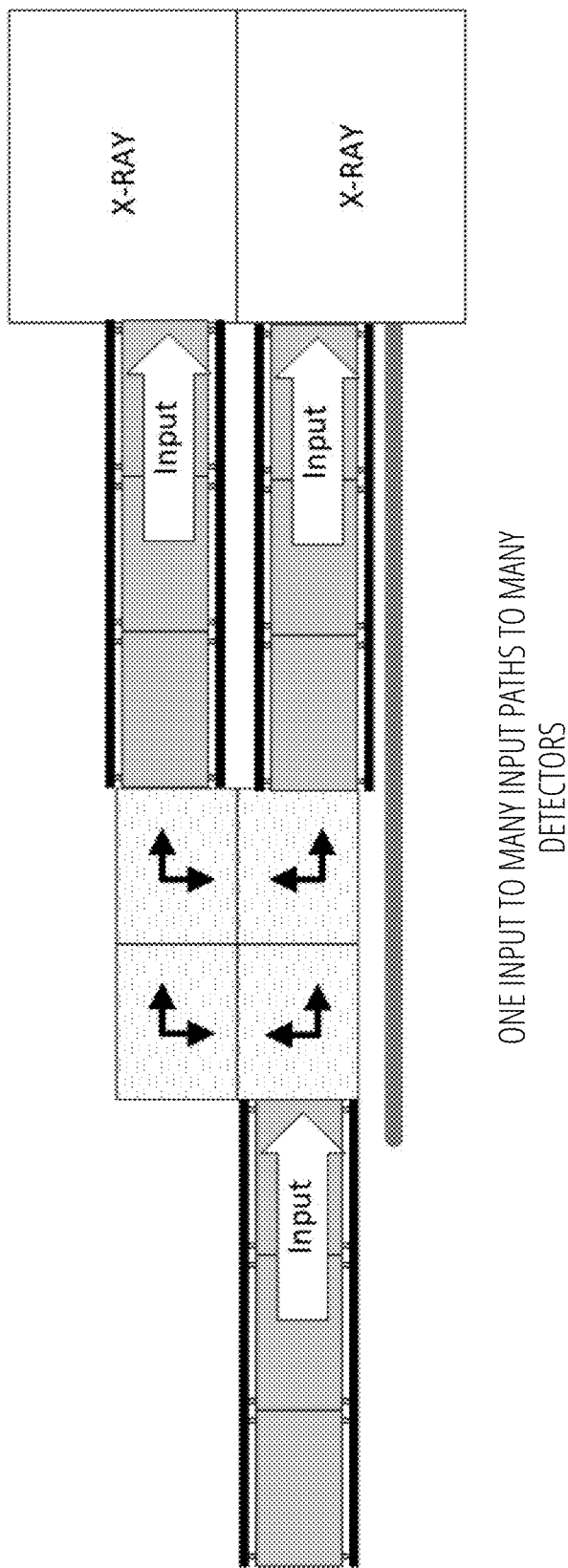
FIG. 50 illustrates a security lane with a side-buffer that facilitates one input to many input paths to many detectors, in accordance with one or more examples.

FIG. 50 illustrates a security lane with a side-buffer that facilitates one input to many input paths to many detectors, in accordance with one or more examples.

Side-buffers may be utilized on the input side of a security lane to feed items to multiple detectors. Any criteria can be utilized to feed items including without limitation: status of a passenger, size or shape of an item, status of a detector, backlog, an algorithm that iteratively between detectors in sequence or combinations thereof. Backlog may include, without limitation, number of items waiting to be scanned at a detector, number of items in holding areas, or number of items in a search area. Status of a detector may include without limitation: online, offline, or magnitude of a load.

A security lane may include side-buffer at the input of the detector, the output of the detector, or both.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, without limitation) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). The term "each" should be interpreted as "some or a totality." The term "each and every" means a "totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure include:

Embodiment 1: A security lane for security checkpoint, comprising: an x-ray scanner system configured to determine threat status of items at least partially based on image data of the item; a conveyor system configured to move items along a primary path and move items along a secondary path; and a side buffer configured to move items on and off the primary path of the conveyor system, and to move items on and off the secondary path of the conveyor system.

Embodiment 2: The security lane according to Embodiment 1, comprising: a holding area, wherein the side buffer is configured to move items to the holding area.

Embodiment 3: The security lane according to any of Embodiments 1 and 2, wherein the holding area is configured to secure an item until it is reviewed.

Embodiment 4: The security lane according to any of Embodiments 1 through 3, wherein the side buffer includes two or more cells organized in a layout where a respective cell is directly adjacent to at least one further respective cell, either horizontally or vertically.

Embodiment 5: The security lane according to any of Embodiments 1 through 4, wherein the side buffer includes at least four cells organized in a layout where a respective cell is directly adjacent to at least two further respective cells, one of the at least two further respective cells horizontally adjacent and another one of the at least two further respective cells vertically adjacent.

Embodiment 6: The security lane according to any of Embodiments 1 through 5, wherein two or more adjacent cells of the side buffer are configured to operate synchronously to cooperatively move a long item.

Embodiment 7: The security lane according to any of Embodiments 1 through 6, wherein two or more diagonally adjacent cells of the side buffer are configured to diagonally transfer items therebetween.

Embodiment 8: The security lane according to any of Embodiments 1 through 7, wherein the respective cell includes one or more diverter mechanisms for moving an item from the respective cell directly to one or more further cells adjacent to the respective cells.

Embodiment 9: The security lane according to any of Embodiments 1 through 8, wherein the side buffer forms at least a portion of the conveyor system.

Embodiment 10: The security lane according to any of Embodiments 1 through 9, wherein the side buffer is configured to hold one or more items off the primary path while allowing other items to move along the primary path.

Embodiment 11: The security lane according to any of Embodiments 1 through 10, wherein the side buffer includes cells that are off the primary path and cells that are on the primary path.

Embodiment 12: The security lane according to any of Embodiments 1 through 11, wherein one of the primary path and the secondary path is toward a clear area and the other of the primary path and the secondary path is toward a search area.

Embodiment 13: The security lane according to any of Embodiments 1 through 12, comprising: a controller to manage the security lane, the controller configured to control movement of an item in the side buffer at least partially responsive to a threat status of the item determined by the x-ray scanner system.

Embodiment 14: The security lane according to any of Embodiments 1 through 13, wherein the side buffer is configured to move items to one or more cells of the side buffer and hold the item at the one or more cells at least until a threat status is assigned to the item by the x-ray scanner system.

Embodiment 15: The conveyor system for a security lane of a security checkpoint according to any of Embodiments 1 through 14, wherein the side buffer includes at least four cells, and two or more adjacent cells of the at least four cells are configured to operate synchronously to cooperatively move items.

Embodiment 16: The conveyor system for a security lane of a security checkpoint according to any of Embodiments 1 through 15, wherein two or more adjacent cells of the at least four cells are configured to operate synchronously to cooperatively move items with respective dimensions exceeding the capacity of any single one of the cells of the at least four cells.

Embodiment 17: The conveyor system for a security lane of a security checkpoint according to any of Embodiments 1 through 16, wherein the two or more adjacent cells respectively include mechanisms to align and integrate their operational movement of items with operational movement of items of the other cells of the two or more adjacent cells to ensure seamless conveyance of items.

Embodiment 18: The conveyor system for a security lane of a security checkpoint according to any of Embodiments 1 through 17, wherein the mechanisms to align and integrate its operational movement of items include one or more of synchronization motors, sensors and feedback systems, guide rails, automated control systems, interlocking belts, or variable speed drivers.

Embodiment 19: A method, comprising: threat analyzing an item at a security lane of a security checkpoint; moving the item, via a conveyor system and a side buffer, to a holding area of the security lane, the holding area distinct and separate from a main path to a clear area and a secondary path to a search area, in response to a pending determination of a threat status of the item; and permitting other items to proceed to the clear area via the main path of the security lane while the item is in the holding area in response to a determination that the other items respectively have non-threat status.

Embodiment 20: The method according to Embodiment 19, comprising: receiving threat information about the item in the holding area; and moving the item to: the clear area in response to the threat information indicating the item is a non-threat; or the search area in response to the threat information indicating the item is a threat.

Embodiment 21: The method according to any of Embodiments 19 and 20, wherein threat analyzing the item comprises: threat analyzing image data of the item generated by an x-ray scanner at the security lane of the security checkpoint.

Embodiment 22: The method according to any of Embodiments 19 through 21, wherein moving the item to the holding area, the clear area or the search area comprises: moving the item between diagonally adjacent cells of the side buffer.

Embodiment 23: The method according to any of Embodiments 19 through 22, wherein moving the item to the holding area, the clear area or the search area comprises: moving the item via a side buffer configured to move items on and off the primary path of the conveyor system, and configured to move items on and off the secondary path of the conveyor system.

Embodiment 24: The method according to any of Embodiments 19 through 23, wherein moving the item to the holding area, the clear area, or the search area comprises: moving the item via two or more cells of the side buffer, the two or more cells configured to operate synchronously to cooperatively move items with respective dimensions exceeding the capacity of any single one of the cells of at least four cells.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

We claim:

1. A security lane for security checkpoint, comprising:
an x-ray scanner configured to determine threat status of items at least partially based on image data of the item;
a conveyor configured to move items along a primary path and move items along a secondary path;
a holding area, the holding area distinct and separate from the primary path of the conveyor and the secondary path of the conveyor;
a side buffer configured to move items on and off the primary path of the conveyor, to move items on and off the secondary path of the conveyor, and to move items to and away from the holding area; and
a controller to manage the security lane, the controller configured to control movement of an item in the side buffer at least partially responsive to a pending determination of a threat status of the item.

2. The security lane of claim 1, wherein the holding area is configured to secure an item until it is reviewed.

3. The security lane of claim 1, wherein the side buffer includes two or more cells organized in a layout where a respective cell is directly adjacent to at least one further respective cell, either horizontally or vertically.

4. The security lane of claim 3, wherein two or more adjacent cells of the side buffer are configured to operate synchronously to cooperatively move a long item.

5. The security lane of claim 3, wherein two or more diagonally adjacent cells of the side buffer are configured to diagonally transfer items therebetween.

6. The security lane of claim 3, wherein the respective cell includes one or more diverter mechanisms for moving an item from the respective cell directly to one or more further cells adjacent to the respective cells.

7. The security lane of claim 1, wherein the side buffer includes at least four cells organized in a layout where a respective cell is directly adjacent to at least two further respective cells, one of the at least two further respective cells horizontally adjacent and another one of the at least two further respective cells vertically adjacent.

8. The security lane of claim 1, wherein the side buffer forms at least a portion of the conveyor.

9. The security lane of claim 1, wherein the side buffer is configured to hold one or more items off the primary path while allowing other items to move along the primary path.

10. The security lane of claim 9, wherein the side buffer includes cells that are off the primary path and cells that are on the primary path.

11. The security lane of claim 1, wherein one of the primary path and the secondary path is toward a clear area and the other of the primary path and the secondary path is toward a search area.

12. The security lane of claim 1, wherein the side buffer is configured to move items to one or more cells of the side buffer and hold the item at the one or more cells at least until a threat status is assigned to the item by the x-ray scanner.

13. The conveyor for a security lane of a security checkpoint of claim 1, wherein the side buffer includes at least four cells, and two or more adjacent cells of the at least four cells are configured to operate synchronously to cooperatively move items.

14. The conveyor for a security lane of a security checkpoint of claim 13, wherein two or more adjacent cells of the at least four cells are configured to operate synchronously to cooperatively move items with respective dimensions exceeding the capacity of any single one of the cells of the at least four cells.

15. The conveyor for a security lane of a security checkpoint of claim 14, wherein the two or more adjacent cells respectively include mechanisms to align and integrate their operational movement of items with operational movement of items of the other cells of the two or more adjacent cells to ensure seamless conveyance of items.

16. The conveyor for a security lane of a security checkpoint of claim 15, wherein the mechanisms to align and integrate its operational movement of items include one or more of synchronization motors, sensors and feedback, guide rails, automated control, interlocking belts, or variable speed drivers.

17. The security lane of claim 1, comprising a control logic configured to dynamically determine one of the primary path or the secondary path and cause the side buffer to move items on or off the primary path or the secondary path at least partially responsive to the determination.

18. The security lane of claim 1, wherein the primary path, the secondary path, and side buffer are upstream or downstream from the x-ray scanner.

19. A method, comprising:
threat analyzing an item at a security lane of a security checkpoint;
moving the item, via a conveyor and a side buffer, to a holding area of the security lane, the holding area distinct and separate from a main path to a clear area and a secondary path to a search area, in response to a pending determination of a threat status of the item; and
permitting other items to proceed to the clear area via the main path of the security lane while the item is in the holding area in response to a determination that the other items respectively have non-threat status.

20. The method of claim 19, comprising:
receiving threat information about the item in the holding area; and
moving the item to:
the clear area in response to the threat information indicating the item is a non-threat; or
the search area in response to the threat information indicating the item is a threat.

21. The method of claim 19, wherein threat analyzing the item comprises:
threat analyzing image data of the item generated by an x-ray scanner at the security lane of the security checkpoint.

22. The method of claim 19, wherein moving the item to the holding area, the clear area or the search area comprises:
moving the item between diagonally adjacent cells of the side buffer.

23. The method of claim 19, wherein moving the item to the holding area, the clear area or the search area comprises:
moving the item via a side buffer configured to move items on and off the main path of the conveyor, and configured to move items on and off the secondary path of the conveyor.

24. A method, comprising:
threat analyzing an item at a security lane of a security checkpoint;
moving the item, via a conveyor and two or more cells of a side buffer, to a holding area of the security lane, the holding area distinct and separate from a main path to a clear area and a secondary path to a search area, in response to a pending determination of a threat status of the item,
wherein the side buffer is configured to move items on and off the main path of the conveyor, and configured to move items on and off the secondary path of the conveyor,
wherein the two or more cells are configured to operate synchronously to cooperatively move items with respective dimensions exceeding the capacity of any single one of the two or more cells; and
permitting other items to proceed to the clear area via the main path of the security lane while the item is in the holding area in response to a determination that the other items respectively have non-threat status.

\* \* \* \* \*

UNITED STATES PATENT AND TRADEMARK OFFICE
CERTIFICATE OF CORRECTION

PATENT NO. : 12,428,241 B1
APPLICATION NO. : 18/792352
DATED : September 30, 2025
INVENTOR(S) : Andrew Iannetti et al.

Page 1 of 1

It is certified that error appears in the above-identified patent and that said Letters Patent is hereby corrected as shown below:

In the Specification

| | | |
|---|---|---|
| Column 1, | Line 27, | change "first introduced." to --first introduced. The patent or application file contains at least one drawing executed in color. Copies of this patent or patent application publication with color drawing(s) will be provided by the Office upon request and payment of the necessary fee.-- |
| Column 3, | Line 65, | change "this description the term" to --this description, the term-- |
| Column 9, | Line 33, | change "wheels-respectively" to --wheels—respectively-- |
| Column 10, | Line 41, | change "components-security" to --components—security-- |
| Column 10, | Line 43, | change "areas-a side" to --areas—a side-- |

Signed and Sealed this
Twenty-fifth Day of November, 2025

John A. Squires
*Director of the United States Patent and Trademark Office*